United States Patent [19]

Diemer et al.

[11] Patent Number: 4,967,096
[45] Date of Patent: Oct. 30, 1990

[54] CROSS-START BUS CONFIGURATION FOR A VARIABLE SPEED CONSTANT FREQUENCY ELECTRIC POWER SYSTEM

[75] Inventors: John W. Diemer; Michael D. Teagardin, both of Rockford, Ill.

[73] Assignee: Sundstrand Corporation, Rockford, Ill.

[21] Appl. No.: 303,424

[22] Filed: Jan. 26, 1989

[51] Int. Cl.$^5$ .......................... H02J 3/00; F02N 11/00
[52] U.S. Cl. ...................................... 307/19; 290/4 R; 290/38 R; 322/10; 307/45
[58] Field of Search ............. 290/4 R, 4 A, 4 B, 4 C, 290/4 D, 10, 11, 19, 27, 36 R, 38 R, 46, 47; 307/18–20, 43–45, 47, 24, 29, 57, 58, 64, 65, 82, 84, 85–87; 322/10; 318/156

[56] References Cited

U.S. PATENT DOCUMENTS

| | | | |
|---|---|---|---|
| 4,321,645 | 3/1982 | Thom et al. | 361/63 |
| 4,330,743 | 5/1982 | Glennon | 322/10 |
| 4,403,292 | 9/1983 | Ejzak et al. | 364/492 |
| 4,456,830 | 6/1984 | Cronin | 290/27 |
| 4,481,459 | 11/1984 | Mehl et al. | 322/10 |
| 4,645,940 | 2/1987 | Wertheim | 307/66 |
| 4,786,852 | 11/1988 | Cook | 322/10 |

Primary Examiner—A. D. Pellinen
Assistant Examiner—David Osborn
Attorney, Agent, or Firm—David H. Hitt

[57] ABSTRACT

This invention relates to a bus configuration for a dual channel variable speed constant frequency motor/generator aircraft power system providing for both power generation and engine starting. The subject invention provides for isolation of faults which can occur in long power feeders. Further, the subject invention provides for a novel start mode of operation which allows one channel to provide power to the other channel, thereby avoiding inefficient multiple converter operation and potentially faulty power buses. The bus configuration provides for coupling a first motor/generator to a second motor/generator via a first converter to thereby allow th first motor/generator, operating as a generator, to supply variable frequency power to the first converter, the first converter supplying variable frequency power to the second motor/generator to operate the second motor/generator as a motor. A cross-start circuit is provided for selectively coupling the first channel to the second channel to allow power to be transferred between the first channel and the second channel is supplied to allow the novel start mode. The cross-start circuit completely decouples from the first and second channels when the cross-start circuit is electrically faulted, resulting in electrical isolation of the first and second channels from the fault thereby allowing continued operation of the first and second channels.

17 Claims, 18 Drawing Sheets

FIGURE 3A

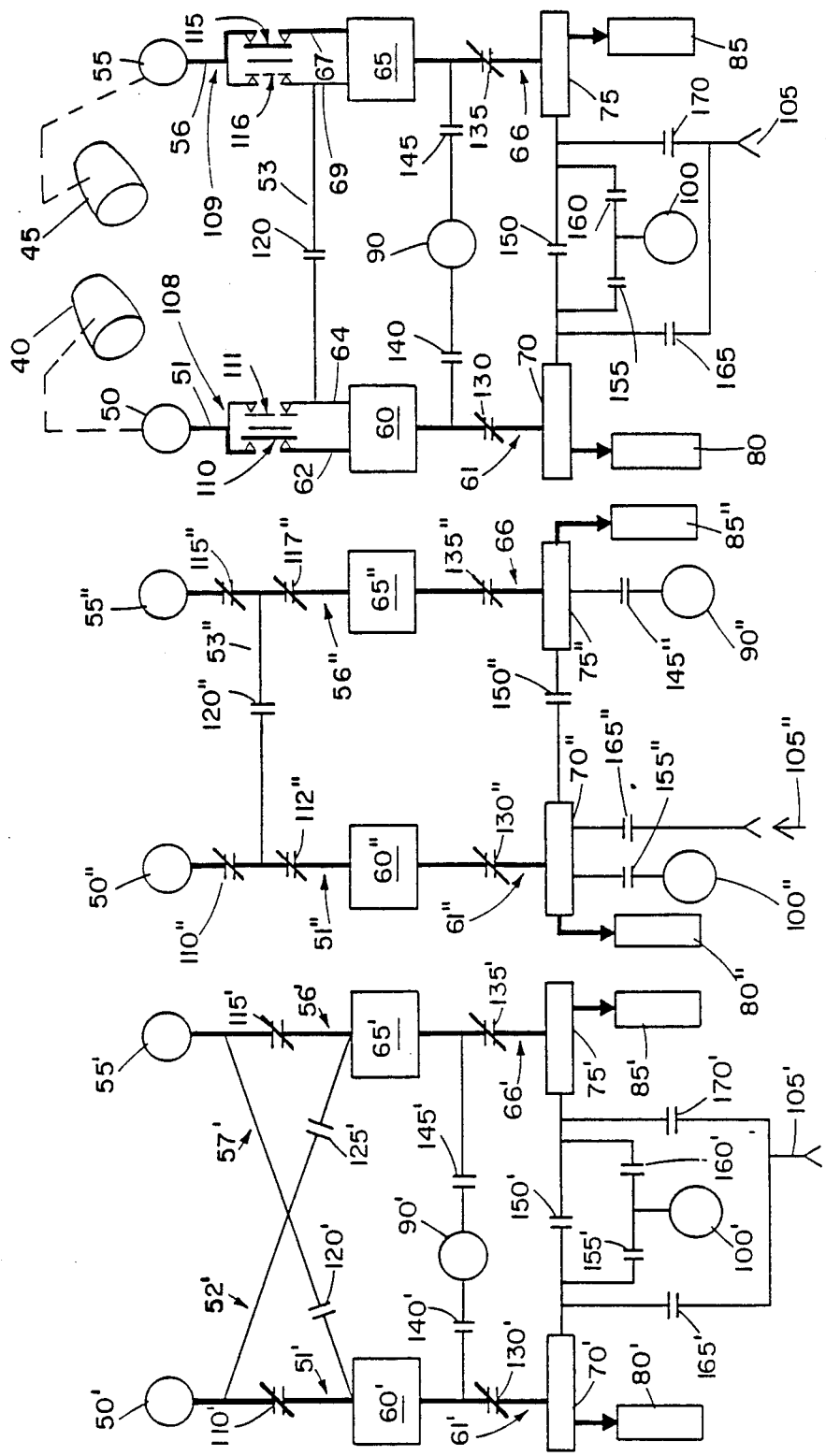

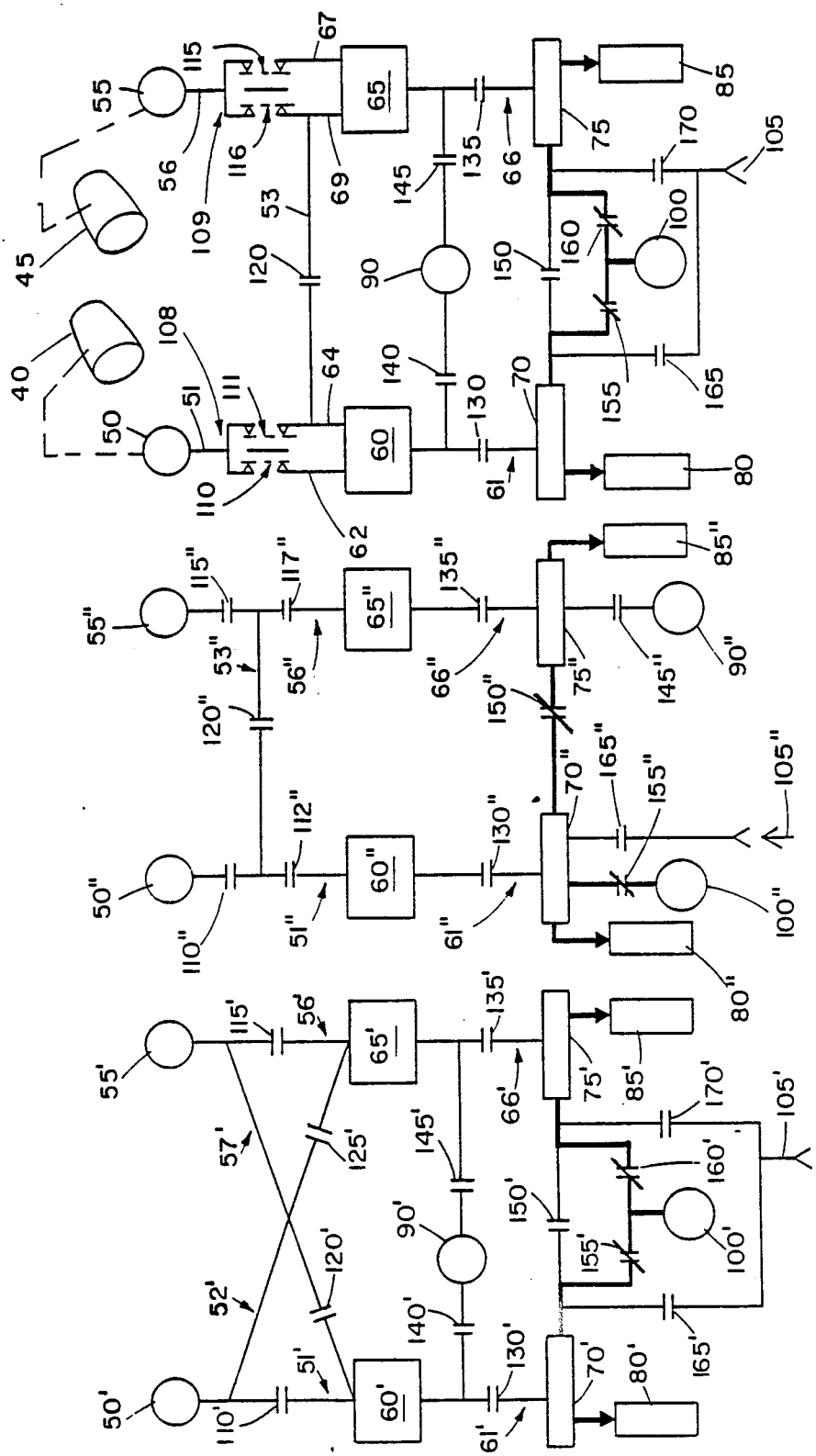

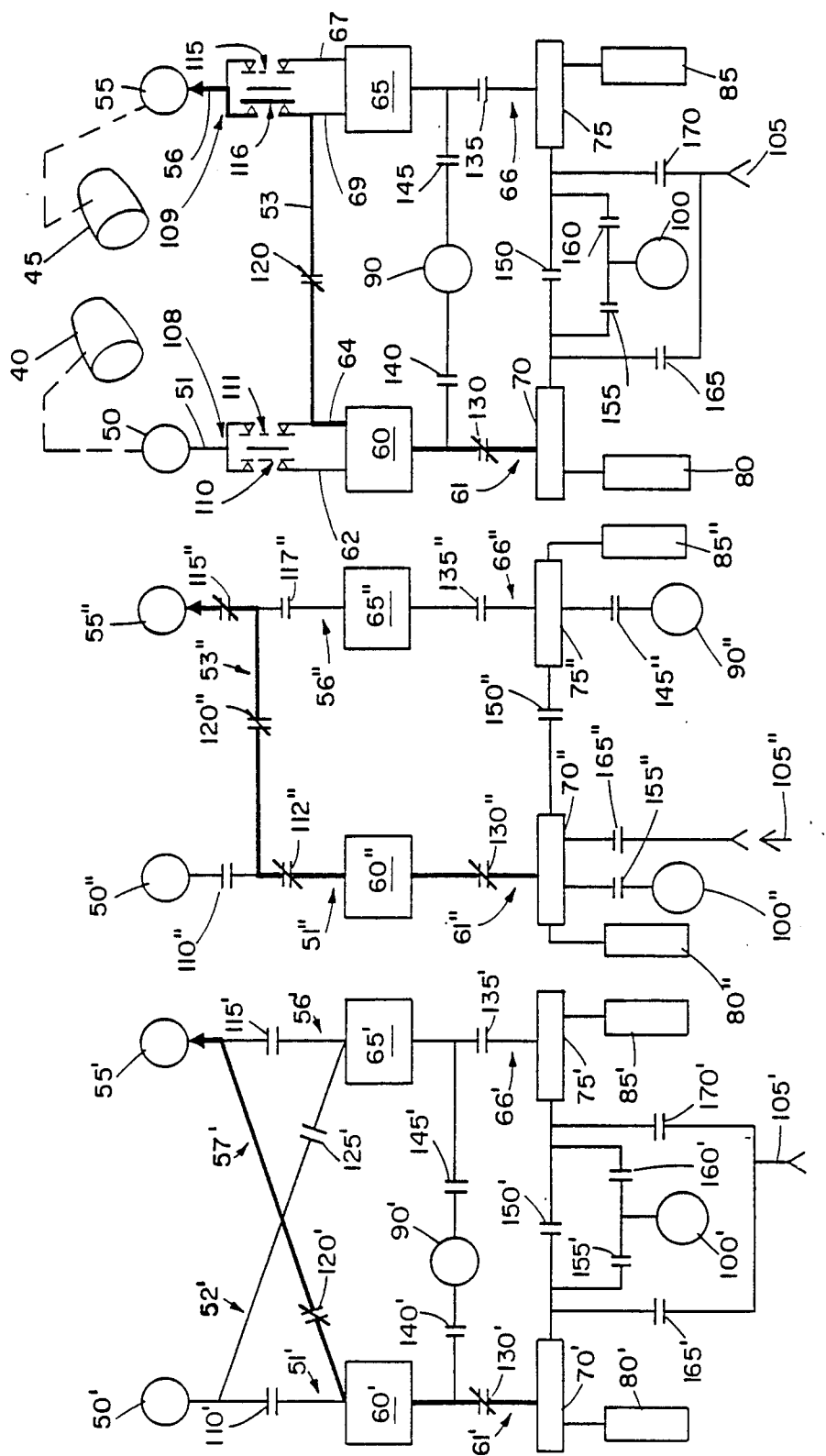
FIGURE IIC
FIGURE IIB (PRIOR ART)
FIGURE IIA (PRIOR ART)

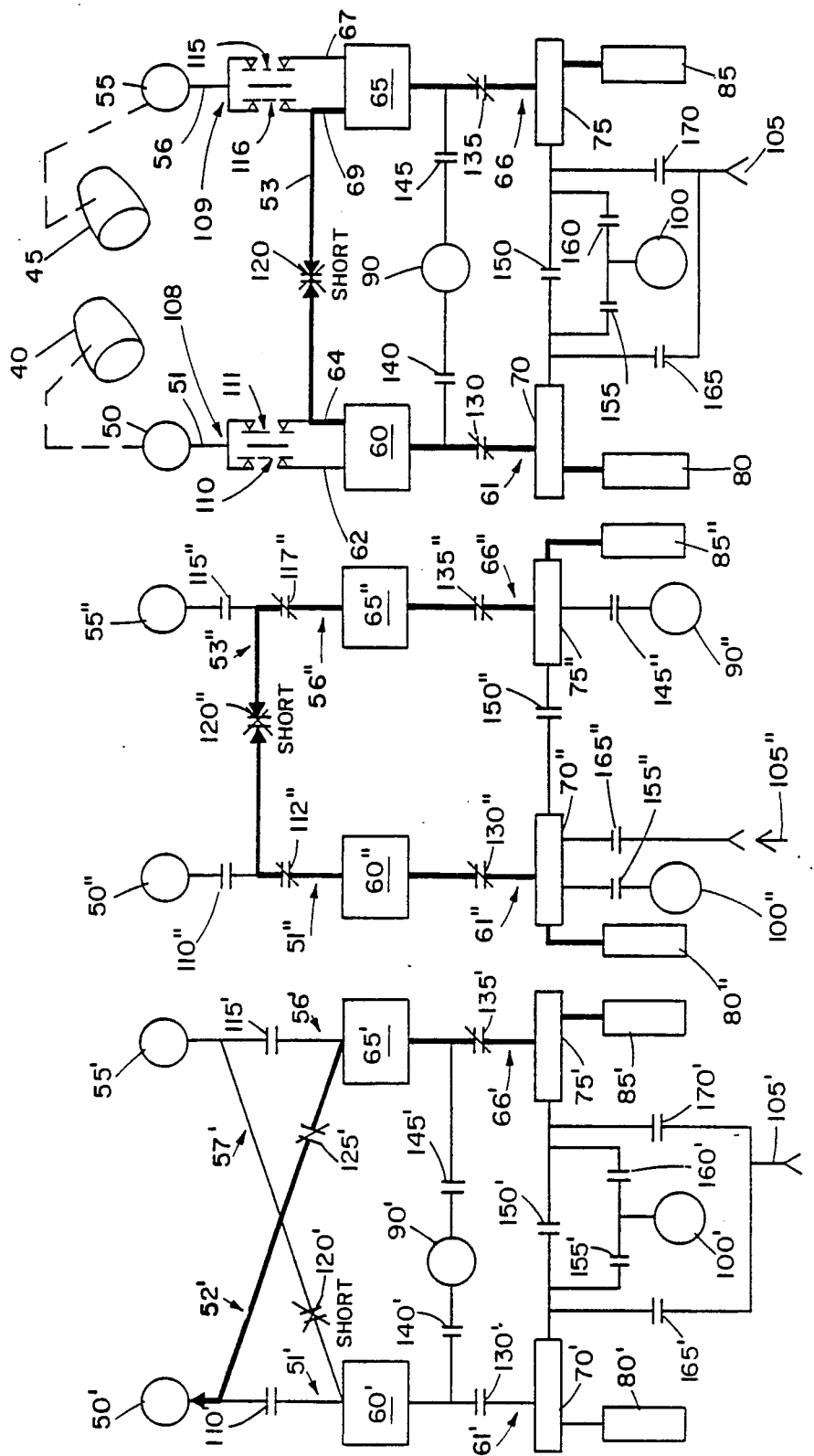

CROSS-START BUS CONFIGURATION FOR A VARIABLE SPEED CONSTANT FREQUENCY ELECTRIC POWER SYSTEM

TECHNICAL FIELD

This invention relates to an electrical power generating and engine starting bus system for use onboard aircraft wherein dual channels are employed, each providing constant frequency alternating current to the aircraft and each alternatively providing motive power to the aircraft's jet engines for engine starting. More specifically, the invention relates to an improved cross-start subsystem wherein a relay and feeder configuration is provided to permit one channel to supply power to the other channel so either aircraft engine may be started by power from either channel.

BACKGROUND ART

Aircraft bus systems, in the general sense, are not new. For years, different applications have demanded bus systems that supply power for use by aircraft equipment. In recent years, such bus systems have been made more flexible to allow external sources to provide power to the bus system to permit engine starting via a motor/generator, and, in the case of an aircraft having more than one channel, such bus systems also have included connections between the channels to allow one channel to supply power to the other for cross-channel engine starting.

On a modern jet aircraft, it is important to have a bus system which is flexible, fault tolerant and efficient. Flexibility in today's aircraft means that the bus system must be able to accept power from a number of power sources, including jet engine-driven variable speed constant frequency solid state power supplies, auxiliary power units, ram air driven emergency power generators and ground cart power supplies. Furthermore, true flexibility includes the ability not only to deliver high quality three phase 400 Hertz power to sensitive electronic equipment, but to deliver three phase variable frequency power to an engine-starting motor, thereby eliminating the need to start the engine with conventional means (either an airframe mounted or cart mounted air turbine starter). This engine-starting capability also has utility when the plane is flying; if an engine stalls, no cart would be present.

Fault tolerance is also a critical issue. As aircraft grow more complex, a greater chance arises for faults to occur within the electrical system. If the bus system is not able to work around these faults at least partially as they occur, the effect upon the airplane's continued ability to fly could be devastating. Accordingly, aircraft are now provided with dual channel redundant bus systems, at a minimum. Therefore, at least some equipment should remain functional in the event of bus feeder or relay failure. Failure is a concern given the extreme operating conditions under which these systems must function. Electrical buses must span the length of the aircraft, hundreds of feet in some cases. Cross-start feeders must span from engine to engine, which may be a hundred feed through wing, wing root and fuselage. Structural failure of the airplane may sever or short a bus or feeder. Relays must remain mechanically operable in the face of extreme heat, cold and vibration for hundreds of hours. The bus system must allow for failure of any one of the several relays in the typical system. In short, improvements in bus systems tend to yield remarkable increases in flexibility and bus reliability.

Finally, bus systems must be efficient. Since the power buses and feeders are so long, line losses due to resistance and stray inductance and capacitance become significant. In power-critical modes of operation (such as when a converter in one channel supplies power to a converter in another channel), line losses must be kept to a minimum. Otherwise, generators and converters must be designed larger and heavier to compensate for the extra load brought about by line losses. Furthermore, since converters are only between 80% and 90% efficient, it is desirable to avoid using two converters in series, which only further increases power requirements.

Several patents address the feature of providing a bus system which operates as a power generating system in one mode and an engine starting system in another mode.

Typical of such patents is U.S. Pat. No. 4,330,743, which issued on May 18, 1982 to Glennon, entitled "Electrical Aircraft Engine Start and Generating System" and assigned to the assignee of the instant invention. The Glennon invention is directed to an electrical aircraft engine start and generating system for use in an aircraft having an engine driven torque converter coupled to an alternator which provides AC power for conversion to CC and AC power. The system includes a reversible AC to DC converter controllably electrically coupled to the alternator and a controller unit to provide DC power in a generating mode. The reversible AC to DC converter is capable of receiving externally supplied DC power to be converted to AC power to drive the alternator as a motor in a start mode. A DC to AC converter is controllably electrically coupled to the controller unit and the DC power output during the generating mode. The reversible DC to AC converter in the start mode is mutually controllably electrically coupled to the externally supplied DC power. The controller unit and the alternator cooperate to provide a controlled AC power output to be delivered to the alternator to bring the alternator operating as a motor up to operating speed, whereupon the reversible AC to DC converter responds to the external DC power and to the electrically coupled alternator to drive the alternator as a motor to deliver rotary power through the torque converter to start the aircraft engine. Accordingly, Glennon provides for a bidirectional system: one which provides constant frequency power to aircraft loads by converting variable frequency power supplied by a prime mover via a motor/generator and one into which power may be accepted from an external power source and delivered to the prime mover via the motor/generator as motive power to start the prime mover. Glennon describes the operation of a single channel system for starting an engine using DC electric power as the power source. Although Glennon does deal with electrical engine starting, apparently it does not deal at all with a dual channel cross-start configuration. The instant invention concerns the feeder and relay configuration in and between the buses of a dual channel aircraft power system.

Also typical of such aircraft power systems is that described in U.S. Pat. No. 4,481,459, which issued on Nov. 6, 1984 to Mehl et al., entitled "Combined Starting/Generating System and Method" and assigned to the assignee of the instant invention.

Mehl et al. is directed to a power conversion system for converting between electric and motive power which may be utilized either in a generating mode to generate electric power from motive power supplied by a prime mover or in a starting mode wherein motive power is developed by the power conversion system from electrical power and is supplied through a torque converter to the prime mover to start the same. The power conversion system includes a main generator, an exciter and a permanent magnet generator, or PMG, which together comprise a brushless alternator. When operated in the starting mode, power is supplied to the PMG to cause it to act as a motor and thereby drive a rotor which is common to the PMG, exciter and main generator. Once a predetermined operating condition of the generator is attained, the main generator is supplied power from a motor control to cause the generator to act as a synchronous motor and the power supply to the PMG is disconnected. The torque converter is then commanded to transfer motive power from the generator to the prime mover to start same. Apparently, among other things, Mehl et al. describes the operation of a start system that uses AC electrical power as the power source as contrasted with Glennon which discloses an engine starting system using DC power as the power source. As with Glennon, Mehl et al. deals with electrical engine starting in a single channel system. However, Mehl et al. evidently does not deal at all with a dual channel configuration having cross-start capability.

Still other patents have dealt with the problem of providing parallel power sources with interconnections therebetween to allow transfer of power from one source to another to provide for an uninterruptable power supply.

U S. Pat. No. 4,645,940, which issued on Feb. 24, 1987 to Wertheim, entitled "Interrupt-Free Unregulated Power Supply" is an example. Wertheim is directed to a primary and at least one back-up alternating voltage source coupled to a common load to provide interrupt-free electric current through a simplified interconnect network. Phase control of all but one of the sources is accomplished by monitoring the phase difference across choke coils coupling the sources to the load. In other words, Wertheim provides for multiple interconnected sources, but fails to provide for engine starting, a primary object of the instant invention. Further, Wertheim is not directed to a variable speed constant frequency bus system.

In the past, need has arisen for dual channel power systems which provide for generate, direct start and cross-start modes of operation. There are two prior art dual channel power systems, not known to be patented, which provide for variable speed constant frequency power generation and direct and cross-starting of aircraft engines.

Reference is now made to FIG. 1 which shows, diagrammatically, an existing dual bus scheme with cross-start capability (designated "System I"). Reference is also made to FIG. 2, which diagrammatically shows another existing dual bus scheme with cross-start capability (designated "System II").

Both System I and System II will be compared to the instant invention and differences noted below since a fuller appreciation of the advantages of the instant invention is best obtained by showing the operation of all three bus configurations under a variety of operating conditions.

None of the aforementioned prior art inventions provide for cross-start operation wherein one motor/generator, operating as a generator operates the other motor/generator as a motor via a single converter, thereby increasing the efficiency of power transmission. Further, none of the aforementioned inventions was designed to overcome the problem of isolating faults in cross-start feeders and relays in order to maintain power generation, direct start and cross-start operation in the face of the cross-start feeder or relay fault. The instant invention is the first to provide a variable speed constant frequency bus system which provides for single converter generator-to-motor cross-start operation and the first to address the problem of isolating cross-start faults, providing for normal channel operation during generate mode.

SUMMARY OF THE INVENTION

It is therefore a primary object of this invention to provide a circuit coupling a first motor/generator to an external electrical load via a first converter and a first power bus for providing variable frequency power from the first motor/generator to the first converter, the first converter supplying constant frequency power to the external electrical load when said circuit is in a generate mode.

It is also a primary object of this invention to provide a switchable cross-start circuit joining first and second variable speed constant frequency channels to electrically isolate the cross-start circuit in the event of a fault in the cross-start circuit.

Another object of the invention is to provide a circuit coupling an external constant frequency electrical source to a first motor/generator via a first power bus and a first converter for providing power from the external constant frequency electrical source to the first converter, the first converter supplying variable frequency power to the first motor/generator to operate the first motor/generator as a motor when the circuit is in a direct start mode.

Yet another object of the invention is to provide a circuit coupling a first motor/generator to a second motor/generator via a first converter, first power bus, second power bus and second converter for providing variable frequency power from the first motor/generator operating as a generator, to the first converter, the first converter supplying constant frequency power to the second converter and the second converter supplying variable frequency power to the second motor/generator to operate the second motor/generator as a motor and the second power bus when the circuit is in a constant frequency cross-start mode.

Still another object of the invention is to provide a circuit coupling a first motor/generator to a second motor/generator via a first converter for providing variable frequency power from the first motor/generator operating as a generator, to the first converter, the first converter supplying variable frequency power to the second motor/generator to operate the second motor/generator as a motor when the circuit is in a variable frequency cross-start mode.

A still further object of the invention is to provide a circuit coupling an external constant frequency electrical source to a second motor/generator via a first power bus and a first converter for providing power from the external constant frequency electrical source to the first converter, the first converter supplying variable frequency power to the second motor/generator to operate the second motor/generator as a motor when the circuit is in a variable frequency bus cross-start mode.

A yet further object of the invention is to provide a variable speed constant frequency motor/generator power system wherein a first motor/generator is coupled to a first prime mover to drive or be driven by the first prime mover and a second motor/generator is coupled to a second prime mover to drive or be driven by the second prime mover.

A further object of the invention is to provide a variable speed constant frequency motor/generator power system wherein a first power bus and a second power bus supply constant frequency AC power to an aircraft.

Yet a further object of the invention is to provide a variable speed constant frequency motor/generator power system wherein a first channel and a second channel are adapted to provide three phase AC power to an aircraft.

Still another object of the invention is to provide a variable speed constant frequency motor/generator power system wherein a first converter and a second converter each comprise a filter, rectifier, exciter inverter and a main inverter to thereby produce constant frequency power from variable frequency power, variable frequency power from constant frequency power or variable frequency power from variable frequency power.

Yet a further object of the invention is to provide a variable speed constant frequency motor/generator power system having a first and second prime mover wherein the first and second prime movers are each a jet engine.

Yet another object of the invention is to provide a variable speed constant frequency motor/generator power system wherein a power bus is additionally alternatively connectable to an auxiliary power unit, an emergency generator, or a ground cart power unit, each capable of supplying constant frequency three phase AC power to the power bus.

Yet another object of the invention is to provide a variable speed constant frequency motor/generator power system wherein a first power bus is connected to a second power bus by a controllable bus-tie relay.

Still another object of the invention is to provide a method for operating a motor/generator as a motor in a variable speed constant frequency system by coupling a first motor/generator directly to a first converter, coupling the first converter directly to a second motor/generator, operating the first motor/generator as a generator to supply variable frequency power to the first converter, and operating the second motor/generator as a motor by producing variable frequency power in the first converter, supplying the variable frequency power to the second motor/generator.

In the attainment of the foregoing objects, the apparatus that encompasses the preferred embodiment of the invention is a variable speed constant frequency motor/generator power system having first and second channels, the first channel having a first converter coupled to a first power bus and the second channel having a second converter coupled to a second power bus. The power system further includes a cross-start subsystem, comprising a circuit having generate, direct start, constant frequency cross-start variable frequency cross-start and variable frequency bus cross-start modes wherein: (a) the generate circuit mode couples a first motor/generator to an external electrical load via the first converter and the first power bus to thereby allow the first motor/generator, operating as a generator, to supply variable frequency power to the first converter, the first converter supplying constant frequency power to the external electrical load; (b) the direct start circuit mode couples an external constant frequency electrical source to the first motor/generator via the first power bus and the first converter to allow the external electrical source to supply power to the first converter, the first converter supplying variable frequency power to the first motor/generator to operate the first motor/generator as a motor; (c) the constant frequency cross-start circuit mode couples the first motor/generator to a second motor/generator via the first converter, the first power bus, the second power bus and the second converter to thereby allow the first motor/generator, operating as a generator, to supply variable frequency power to the first converter, the first converter supplying constant frequency power to the second converter via and the second converter supplying variable frequency power to the second motor/generator to operate the second motor/generator as a motor; (d) the variable frequency cross-start circuit mode couples the first motor/generator to the second motor/generator via the first Converter to thereby allow the first motor/generator, operating as a generator, to supply variable frequency power to the first converter, the first converter supplying variable frequency power to the second motor/generator to operate the second motor/generator as a motor; and (e) the variable frequency bus cross-start circuit mode couples the external constant frequency electrical source to the second motor/generator via the first power bus and the first converter to thereby allow the external constant frequency electrical source to supply power to the first converter, the first converter supplying variable frequency power to the second motor/generator to operate the second motor/generator as a motor.

BRIEF DESCRIPTION OF DRAWINGS

FIG. 5a illustrates prior art system I in dual bus generate mode, with no faults, in diagrammatic form;

FIG. 5b illustrates prior art system II in dual bus generate mode, with no faults, in diagrammatic form;

FIG. 5c illustrates the instant invention in dual bus generate mode, with no faults, in diagrammatic form;

FIG. 6a illustrates prior art system I operating on an auxiliary power unit, with no faults, in diagrammatic form;

FIG. 6b illustrates prior art system II operating on an auxiliary power unit, with no faults, in diagrammatic form;

FIG. 6c illustrates the instant invention operating on an auxiliary power unit, with no faults, in diagrammatic form;

FIG. 11a illustrates prior art system I in variable frequency bus cross-start mode left bus to right bus, with no faults, in diagrammatic form;

FIG. 11b illustrates prior art system II in variable frequency bus cross-start mode left bus to right bus, with no faults, in diagrammatic form;

FIG. 11c illustrates the instant invention in variable frequency bus cross-start mode left bus to right bus, with no faults, in diagrammatic form;

FIG. 15a illustrates prior system I invariable frequency bus cross-start mode, with a shorted cross-start relay, in diagrammatic form;

FIG. 15b illustrates prior system II in variable frequency bus cross-start mode, with a shorted cross-start relay, in diagrammatic form;

FIG. 15c illustrates the instant invention in variable frequency bus cross-start mode, with a shorted cross-start relay, in diagrammatic form;

BEST MODE FOR CARRYING INVENTION

Figure 1:
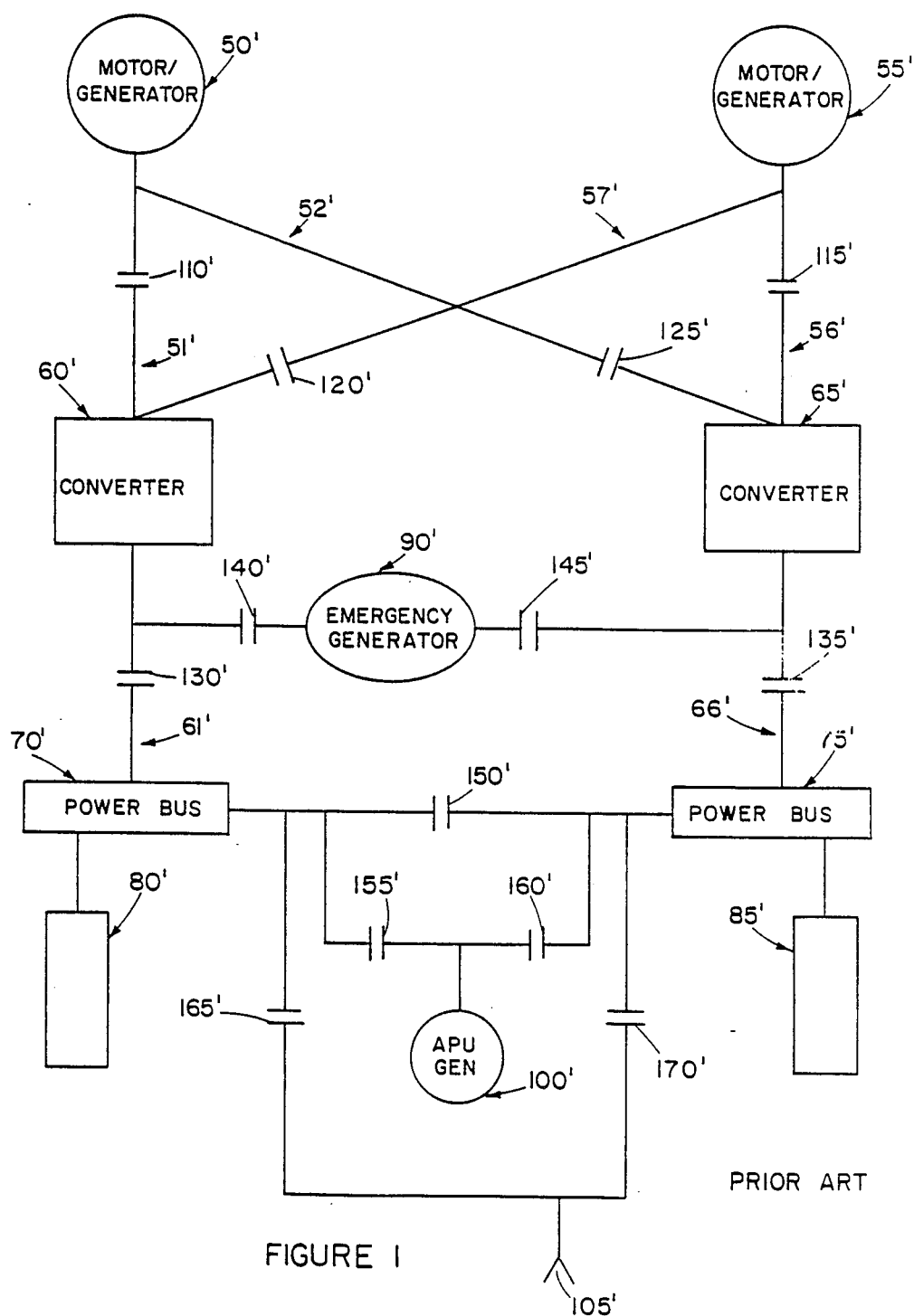
FIG. 1 illustrates, in diagrammatic form, a prior art parallel bus system providing for engine cross-start (designated "System I")

The following discussion makes reference to elements of System I, System II and the instant invention marked by unprimed, primed and double-primed reference numerals. Reference numerals for the instant invention are unprimed, System I numerals are primed and System II numerals are double-primed. This is done to facilitate an understanding of structural correspondence between the systems. The correspondence may not be exact or functional.

Reference is now made to FIG. 1, which illustrates a prior art parallel bus system providing for engine cross-start in diagrammatic form (designated "System I"). System I includes a first channel which is comprised of the following elements: a first motor/generator 50', a first converter 60', a first power bus 70' and a first external aircraft electrical load 80'. A second channel is comprised of the following elements: a second motor/generator 55', a second converter 65', a second power bus 75' and a second external aircraft electrical load 85'.

The first motor/generator 50' is coupled to the first converter 60' by a first motor/generator feeder 51'. The first motor/generator feeder 51' includes a first motor/generator relay 110'. Likewise, the second motor/generator 55' is coupled to the second converter 65' by a second motor/generator feeder 56'. A second motor/generator relay 115' is a part of the second motor/generator feeder 56'. The first converter 60' is coupled to the first power bus 70' by a first bus feeder 61', including a first power bus relay 130'. Likewise, the second converter 65' is coupled to the second power bus 75' by a second power bus feeder 66', including a second power bus relay 135'. The first power bus 70' is coupled to a first external aircraft electrical load 80'. Similarly, the second power bus 75' is coupled to a second external aircraft electrical load 85'. Since System I is a dual channel aircraft power system, the first external aircraft electrical load 80' represents some of the equipment on board an aircraft. The second external aircraft electrical load 85' represents the remainder of the equipment on board the aircraft. No equipment aboard the aircraft is supplied power from the first power bus 70' and the second power bus 75' simultaneously.

In addition to the first and second channel elements and connections outlined above, there are interchannel connections which allow the two channels to supply power to one another or to receive emergency or auxiliary power in some modes of operation. Accordingly, System I provides a first cross-start feeder 52' coupling the first motor/generator 50' to the second converter 65'. The first cross-start feeder 52' includes a first cross-start relay 125'. Likewise, a second cross-start feeder 57' couples the second motor/generator 55' to the first converter 60' and includes a second cross-start relay 120'.

System I includes an emergency generator 90' with first and second emergency generator relays 140' and 145' connecting the emergency generator 90' to the first bus feeder 61' and the second bus feeder 66', respectively. Also, System I provides for an auxiliary power unit generator ("APU") 100' which is joined to the first power bus 70' and second power bus 75' by first and second auxiliary power unit relays 155' and 160', respectively. Further, the first power bus 70' and the second power bus 75' may be joined by closure of a bus tie relay 150'. Finally, an external power inlet 105' may be coupled to either the first power bus 70' or the second power bus 75' by closure of first or second external power relays 165' or 170', respectively. The emergency generator 90', auxiliary power unit generator 100' and external power inlet 105' are sources of constant frequency electric power for providing power to the first or second external aircraft electrical loads 80' and 85' or the first or second motor/generators 50' and 55' for engine starting.

Figure 2:
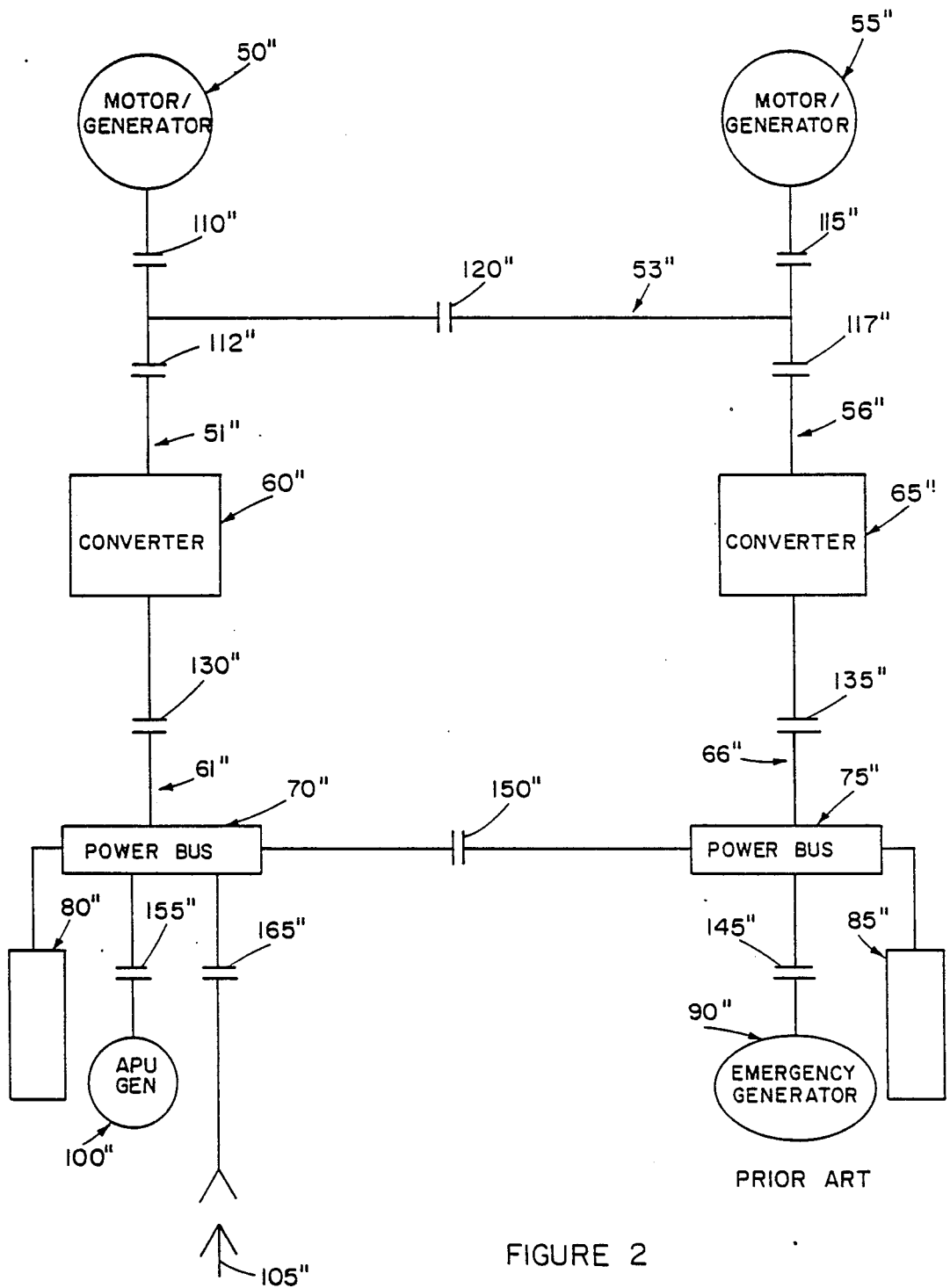
FIG. 2 illustrates, in diagrammatic form, another prior art parallel bus system providing for engine cross-start (designated "System II")

FIG. 2 illustrates another prior art parallel bus system providing for engine cross-start in diagrammatic form (designated "System II"). System II also includes a "first channel" which is comprised of the following elements: a first motor/generator 50", a first converter 60", a first power bus 70" and a first external aircraft electrical load 80". A second channel is comprised of the following elements: a second motor/generator 55", a second converter 65", a second power bus 75" and a second external aircraft electrical load 85".

The first motor/generator 50" is coupled to the first converter 60" by a first motor/generator feeder 51". The first motor/generator feeder 51" includes a first motor/generator relay 110" and a first converter relay 112". Likewise, the second motor/generator 55" is coupled to the second converter 65" by a second motor/generator feeder 56". A second motor/generator relay 115" and a second converter relay 117" are a part of the second motor/generator feeder 56". The first converter 60" is coupled to the first power bus 70" by a first power bus feeder 61", including a first power bus relay 130". Likewise, the second converter 65" is coupled to the second power bus 75" by a second power bus feeder 66", including a second power bus relay 135". The first power bus 70" is coupled to a first external aircraft electrical load 80". Similarly, the second power bus 75" is coupled to a second external aircraft electrical load 85". Since System II is also a dual channel aircraft power system, the first external aircraft electrical load 80" also represents some of the equipment onboard an aircraft. The second external electrical aircraft load 85" represents the remainder of the equipment onboard the aircraft. Like System I, no equipment aboard the aircraft is supplied power from the first power bus 70" and the second power bus 75" simultaneously.

In addition to the first and second channel elements and connections outlined above, there is an interchannel connection which allows the two channels to supply power to one another or to receive emergency or auxiliary power in some modes of operation. Accordingly, System II provides a cross-start feeder 53" coupling the first motor/generator 51" to the second motor/generator 56" at points between the first motor/generator relay 110" and the first converter relay 112" on the first motor/generator feeder 51" and between the second motor/generator relay 115" and the second converter relay 117" on the second motor/generator feeder 57". The cross-start feeder 52" includes a first cross-start relay 120".

System II further includes an emergency generator 90" with an emergency generator relay 140" connecting the emergency generator 90" to the second power bus 75". System II also provides for an auxiliary power unit generator 100" which is joined to the first power bus 70" by an auxiliary power unit relay 155". Further, the first power bus 70" and the second power bus 75" may be joined by closure of a bus tie relay 150". Finally, an external power inlet 105" may be coupled to the first power bus 70" by closure of external power relay 165". The emergency generator 90", auxiliary power unit generator 100" and external power inlet 105" are sources of constant frequency electric power for providing power to the first or second external aircraft electrical loads 80" and 85" or the first and second motor/generators 50" and 55" for engine starting.

Figure 3:
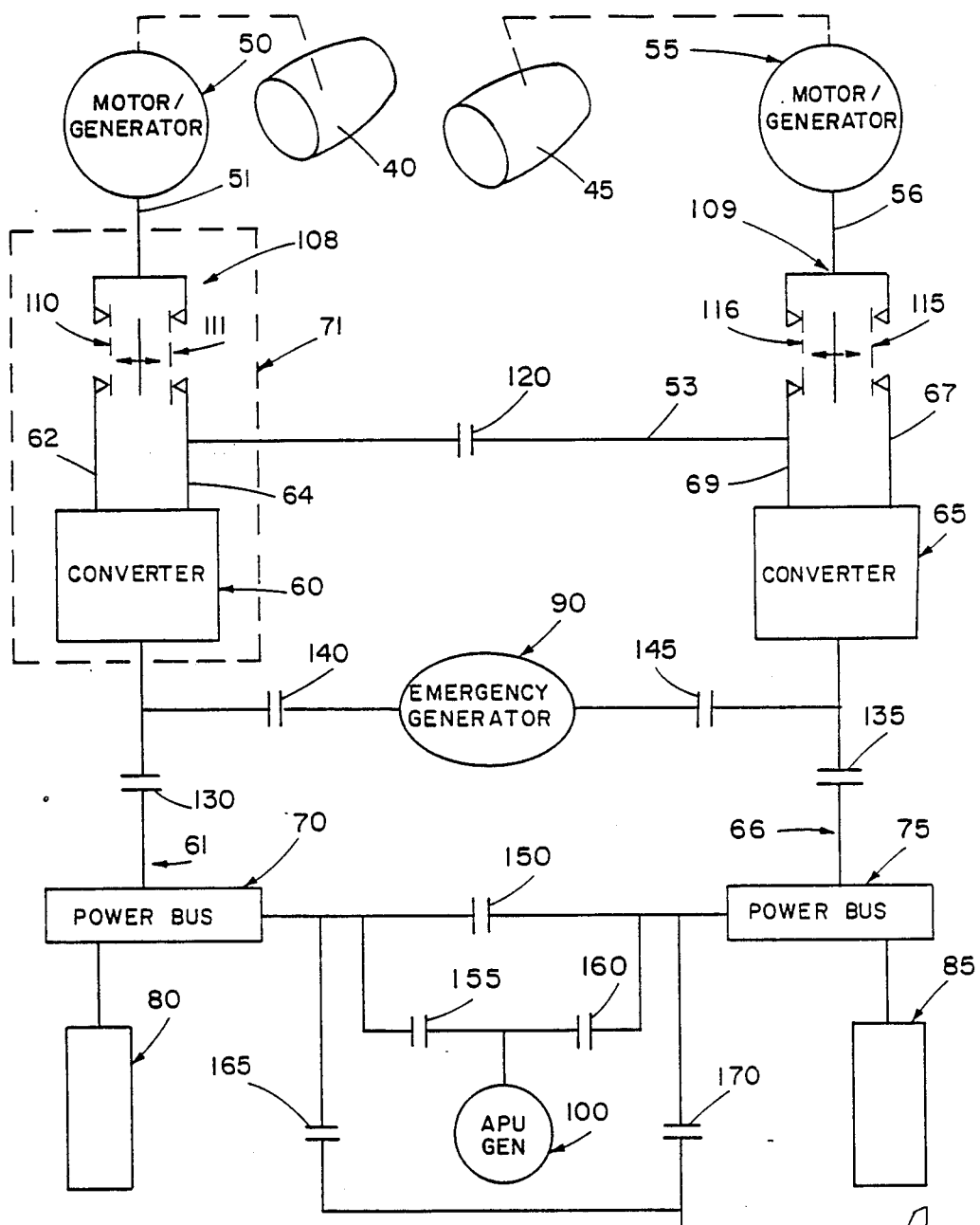
FIG. 3 is diagrammatic representation of the cross-start scheme embodying the instant invention.

In FIG. 3, which embodies the instant invention, there is provided a first channel which is comprised of a first motor/generator 50, a first motor/generator 55, a first converter 60, a first power bus 70, and a first external electrical aircraft load 80 all of which are well known elements of a variable speed constant speed frequency system. The first motor/generator 50 is mechanically driven by a first prime mover 40.

The first motor/generator 50 is coupled to a first motor/generator relay 108 by a first motor/generator feeder 51. The first motor/generator relay 108 is a double-throw relay having a first contact position 110, shown in broken line, and a second contact position 111, similarly depicted. In the first contact position 110, the first motor/generator relay 108 couples the first motor/generator feeder 51 with a first converter input feeder 62, which is switchably connected to the input of the first converter 60 by a switch, not shown in FIG. 3 but shown in FIG. 4 and more fully described hereinafter. In the second contact position 111, the first motor/generator relay 108 couples the first motor/generator feeder 51 to a first converter output feeder 64, which is switchably connected to the output of the converter 60 by a switch, also not shown in FIG. 3 but shown in FIG. 4 and more fully described hereinafter. The first converter 60 is coupled to the first power bus 70 by a first bus feeder 61, including a first power bus relay 130. The first power bus 70 is coupled to the external aircraft electrical load 80, as shown. Again, the first external aircraft electrical load 80 represents some of the equipment on board the aircraft.

A second channel is also provided which is comprised of a second motor/generator 55, a second converter 65, a second power bus 75 and a second external electrical aircraft load 85, all of which are well known elements of a variable speed constant speed frequency system. The second motor/generator 55 is mechanically driven by a second prime mover 45.

The second motor/generator 55 is coupled to a second motor/generator relay 109 by a second motor/generator feeder 56. Like the first motor/generator relay 108, the second motor/generator relay 109 is a double-throw relay having a first contact position 115, shown in broken line, and a second contact position 116, similarly depicted. In its first contact position 115, the second motor/generator relay 109 couples the second motor/generator feeder 56 to a second converter input feeder 67, which is switchably coupled to the second converter 65 by a switch, not shown in FIG. 3 but shown in FIG. 4 and more fully described hereinafter. In its second contact position 116, the second motor/generator relay 109 couples the second motor/generator feeder 56 to a second converter output feeder 69, which is switchably connected to the second converter 65 by a switch, not shown in FIG. 3 but shown in FIG. 4 and more fully described hereinafter. The second converter 65 is coupled to the second power bus 75 by a second bus feeder 66, including a second power bus relay 135. The second power bus 75 is coupled to the external aircraft electrical load 85, as shown. The external aircraft electrical load 85 represents the remainder of the equipment aboard the aircraft. No equipment aboard the aircraft is supplied power from the first power bus 70 and the second power bus 75 simultaneously.

In addition to the dual channel elements and connections outlined above, there are interchannel connections which allow the two channels to supply power to one another or to receive emergency or auxiliary power in some situations. Accordingly, the instant invention provides a cross-start feeder 53 which is coupled to the first converter output feeder 64 and the second converter output feeder 69. The cross-start feeder 53 includes a cross-start relay 120.

The instant invention further includes an emergency generator 90 with first and second emergency generator relays 140 and 145 coupling the emergency generator 90 to the first bus feeder 61 and the second bus feeder 66, respectively. Also, the instant invention provides for an auxiliary power unit generator 100 which is joined to the first power bus 70 and the second power bus 75 by first and second auxiliary power unit relays 155 and 160 respectively. Further, the first power bus 70 and the second power bus 75 may be joined by closure of a bus tie relay 150. Finally, an external power inlet 105 may be coupled to either the first power bus 70 or the second power bus 75 by closure of first and second external power relays 165 and 170, respectively.

Figure 3A:
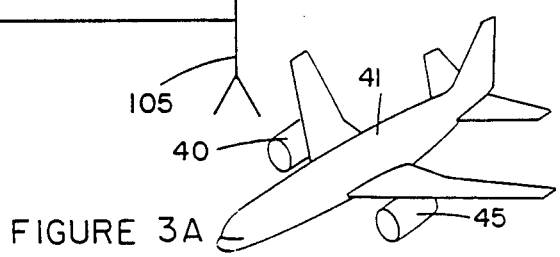
FIG. 3A is a diagrammatic representation of an aircraft having two jet engines which supply motive power to the instant invention.

Referring now to FIG. 3A, shown is a typical aircraft 41 having a first prime mover 40 and a second prime mover 45 (in each case a jet engine). The first and second prime movers 40, 45 provide motive power to the first and second motor/generators 50, 55, respectively.

Figure 4:
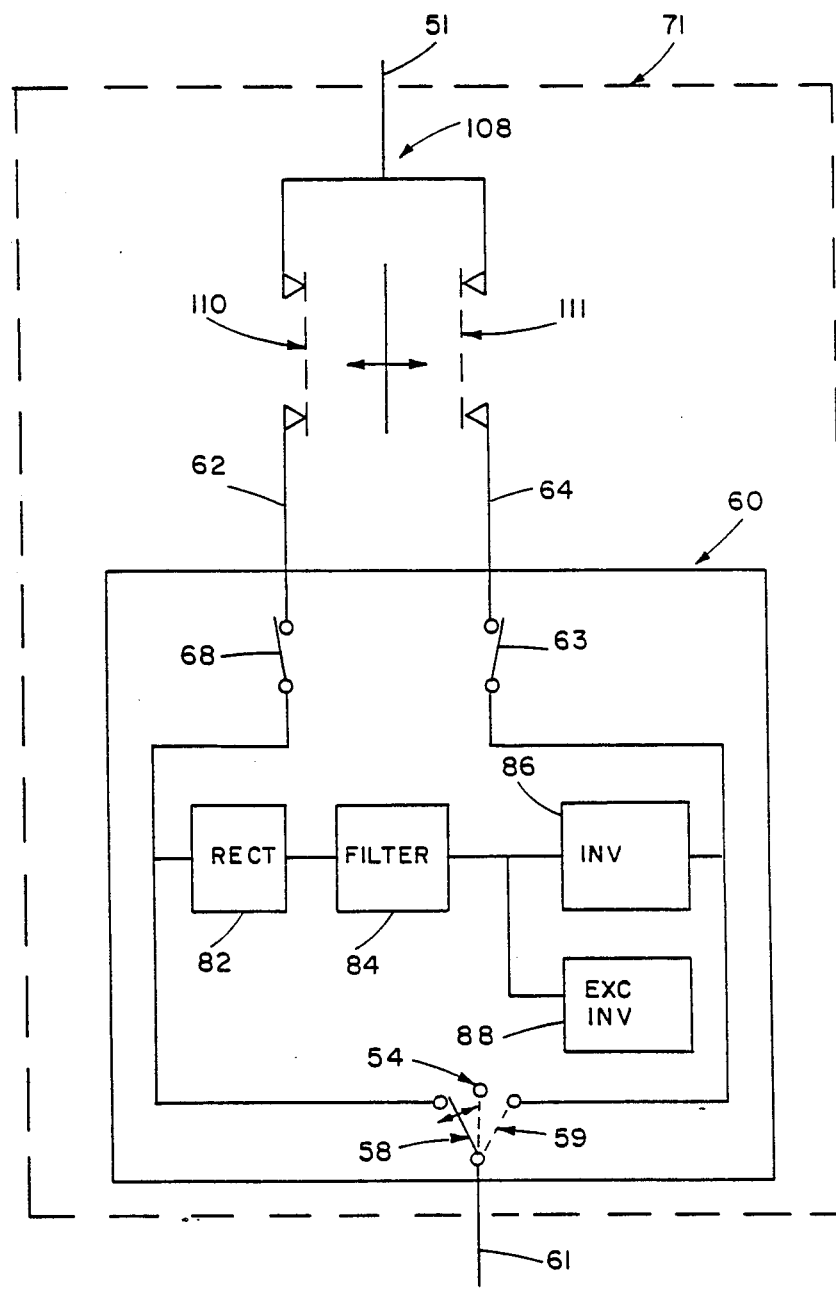
FIG. 4 is a diagrammatic representation of the motor/generator relay and converter package embodying the instant invention.

FIG. 4 is a diagrammatic representation of the motor/generator relay and converter package (designated 71 in FIG. 3) embodying the instant invention. Elements are referenced by numbers corresponding to the first channel, however it should be understood that a corresponding arrangement of elements is used in the second channel.

Referring now to FIG. 4, the first motor/generator feeder 51 is coupled to the first motor/generator relay 108, which, being a double-throw relay, has a first contact position 110 and a second contact position 111. In the first contact position 110, the first motor/generator relay 108 couples the first motor/generator feeder 51 with the first converter input feeder 62, which is switchably connected by a switch 68 to the input of the first converter 60. In the second contact position 111 of motor/generator relay 108, the first motor/generator feeder 51 is coupled to the first converter output feeder 64, which is switchably connected to the output of the converter 60 by switch 63. The first converter 60 is coupled to the first power bus 70 by a first bus feeder 61.

Within the first converter 60 are a rectifier 82, filter 84, and inverter 86 coupled in series. An exciter inverter 88 is coupled to a point between an output of filter 84 and an input of inverter 86. The rectifier 82 receives electrical power, either of constant or varying frequency and produces direct current power which is filtered by filter 84. Once filter 84 has filtered the direct current power, the inverter 86 produces either variable or constant frequency alternating current from the direct current. The inverter 86 is pulse width modulated by a generator control unit (not shown). The exciter inverter 88 likewise takes filtered direct current from the filter 84, producing alternating current power to be supplied to an exciter on the first motor/generator 50 during engine start by means not shown.

The first bus feeder 61 can be connected to either the input of the rectifier 82 or the output of the inverter 86 by means of a switch having a first position 58 (connecting the first bus feeder 61 to the input of rectifier 82), a second neutral position 54, shown in broken line, or a third position 59 (connecting the first bus feeder 61 to the output of inverter 86), similarly depicted. Accordingly, the first bus feeder 61 is by bidirectional: that is, power may be transmitted to the converter 60 or received from the converter 60 by the first bus feeder 61 or the converter input and output feeders 62 and 64, depending upon whether position 58, position 54 or position 59 is selected and upon the positions of switches 68 and 63. When it is desired to received power from the first motor/generator 50, switch 108 is set at its first position 110 and switch 68 is closed. Accordingly, power is delivered from the first motor/generator 50 to the rectifier 82. The first bus feeder 61 receives power from the inverter 86 when its switch is set to position 59. Similarily, when it is desired to receive power from the first bus feeder 61 and deliver it to the first motor/generator 50, switch position 58 is chosen to deliver power from the first bus feeder 61 to the rectifier 82, switch 63 is closed and switch 108 is set at its second position 111 so the first motor/generator 50 receives power from the output of the inverter 86. Alternatively, switch 68 may be closed, switch 63 may be closed, second neutral position 54 chosen for the first bus feeder 61 and switch 108 may be set at position 110 to allow power to be delivered from the first motor/generator 50 to the input of rectifier 82, through filter 84, inverter 86 and out through the first converter output feeder 64 into the cross-start feeder 53.

Generate Mode - No Faults

FIGS. 5a, 5b and 5c show prior art System I, System II and the instant invention operating in dual channel generate mode, with no faults. This is normal operation with the first and second motor/generators operating as generators, serving first and second external aircraft electrical loads, respectively, through first and second converters and first and second power buses, respectively. In this mode, it is assumed that there are no faults either in feeders or in relays and that this will be the mode in which all three systems will usually operate.

Note that in all three systems, power is successfully transferred, evidence by a bold line and arrow, from each motor/generator to each corresponding load. Closure of relays is designated by a slash through each relay. Note that all three systems are able to operate in the generate mode successfully, with no faults present.

Specifically, power is generated in the first channel thus: motive energy is produced in a first prime mover 40, that motive power is transformed into variable frequency AC power by the first motor/generator 50, 50', 50", the variable frequency power is transferred through the first motor/generator relay 108, 110', 110" and through the first motor/generator feeder 51, 51', 51" (System II also requires closure of the first converter relay 112") into the first converter 60, 60', and 60". The converter 60, 60', 60" converts the variable frequency power into constant frequency power, transferring the constant frequency power through the first power bus relay 130, 130', 130", the first bus feeder 61, 61', 61" and then into the first power bus 70, 70', 70". From the first power bus 70, 70', 70", the constant frequency power is transferred to the first load 80, 80', 80". Power transfer in the generate mode in the second channel is accomplished in the same manner in all three systems.

APU Operation - No Faults

FIGS. 6a, 6b and 6c show System I, System II and the instant invention operating on an auxiliary power unit with no faults. In this mode, the auxiliary power unit provides power to both channels of the dual channel system.

In System I and in the instant invention, the APU 100, 100', 100" produces constant frequency power which is transferred to the first power bus 70 and the second power bus 75 via first APU relay 155 and 155' and second APU relay 160, 160', respectively.

In System II, the auxiliary power unit 100" is joined to the first power bus 70" by closure of the APU relay 155". In this manner, power is transferred from the APU 100" to the first load 80". Closure of the bus tie relay 150" accomplishes transfer of power from the APU 100" to the second external aircraft load 85".

Note that in all three systems, power is successfully transferred from the APU to each load. All three system are able to operate in the APU power mode with no faults.

External Power Operation - No Faults

Figures 7A, 7B, 7C:
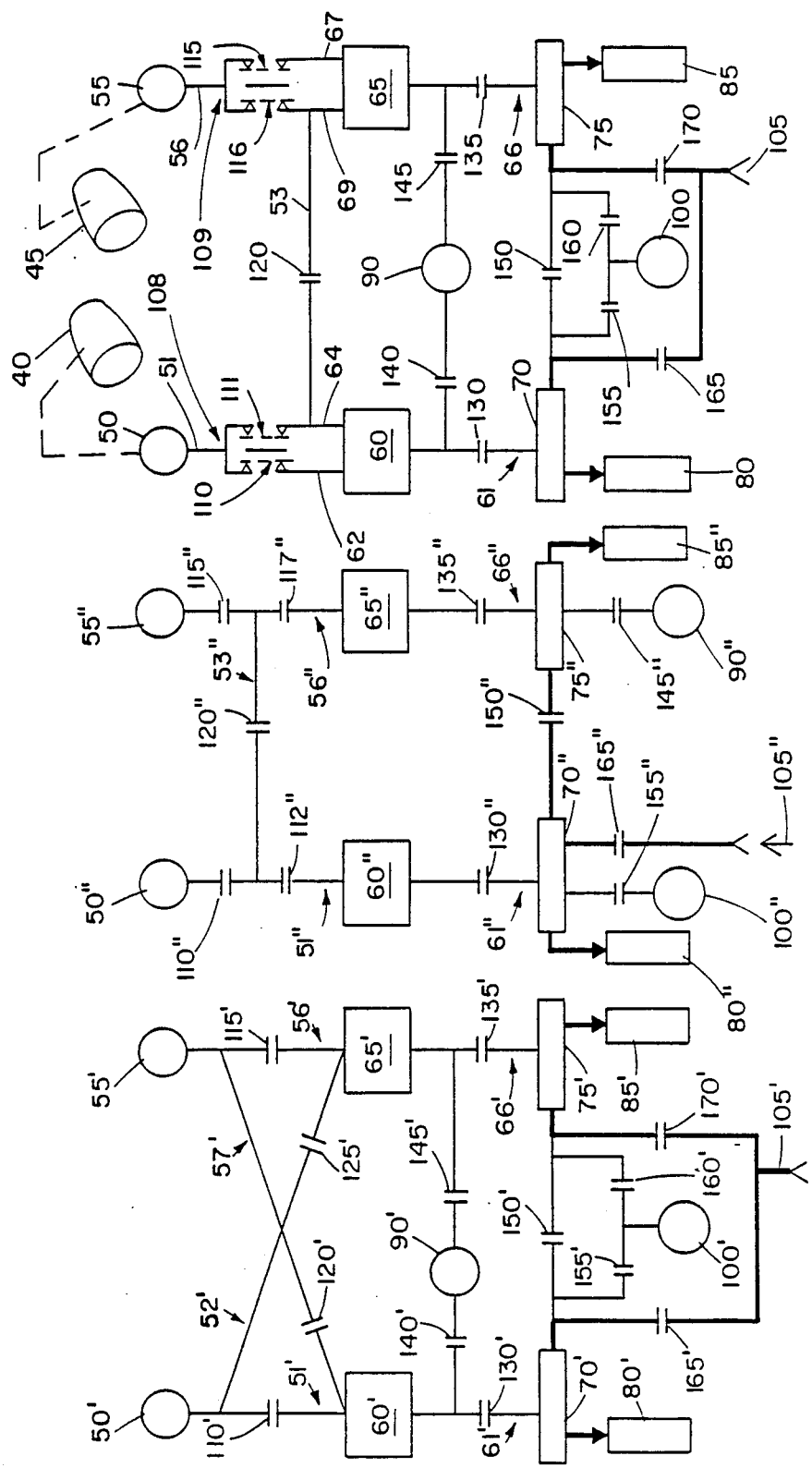
FIG. 7a illustrates prior art system I operating on external power, with no faults, in diagrammatic form.
FIG. 7b illustrates prior art system II operating on external power, with no faults, in diagrammatic form.
FIG. 7c illustrates the instant invention operating on external power, with no faults, in diagrammatic form.

FIGS. 7a, 7b and 7c show System I, System II and the instant invention operating on an external power, with no faults. Operation is similar to that in FIGS. 6a, 6b and 6c.

In System I and the instant invention, constant frequency AC Power enters from a ground cart or other power supply external to the airplane through the external power inlet 105, 105'. The constant frequency power is transferred to the first power bus 70, 70' and the second power bus 75, 75' by closure of the first external power relay 165, 165' and the second external power relay 170, 170', respectively. In this manner, power is transferred from the external power inlet 105, 105' to the first external aircraft load 80, 80' and the second external aircraft electrical load 85, 85'.

In System II, constant frequency power enters through the external power inlet 105" and, by closure of the external power relay 165", enters the first power bus 70". Closure of the bus tie relay 150" accomplishes transfer of power from the external power inlet 105" to the first power bus 70" and the second power bus 75" to power the first external aircraft electrical load 80" and the second external aircraft electrical load 85", respectively.

Note that all three systems are able to successfully operate in the external power mode, with no faults.

Emergency Operation - No Faults

Figures 8A, 8B, 8C:
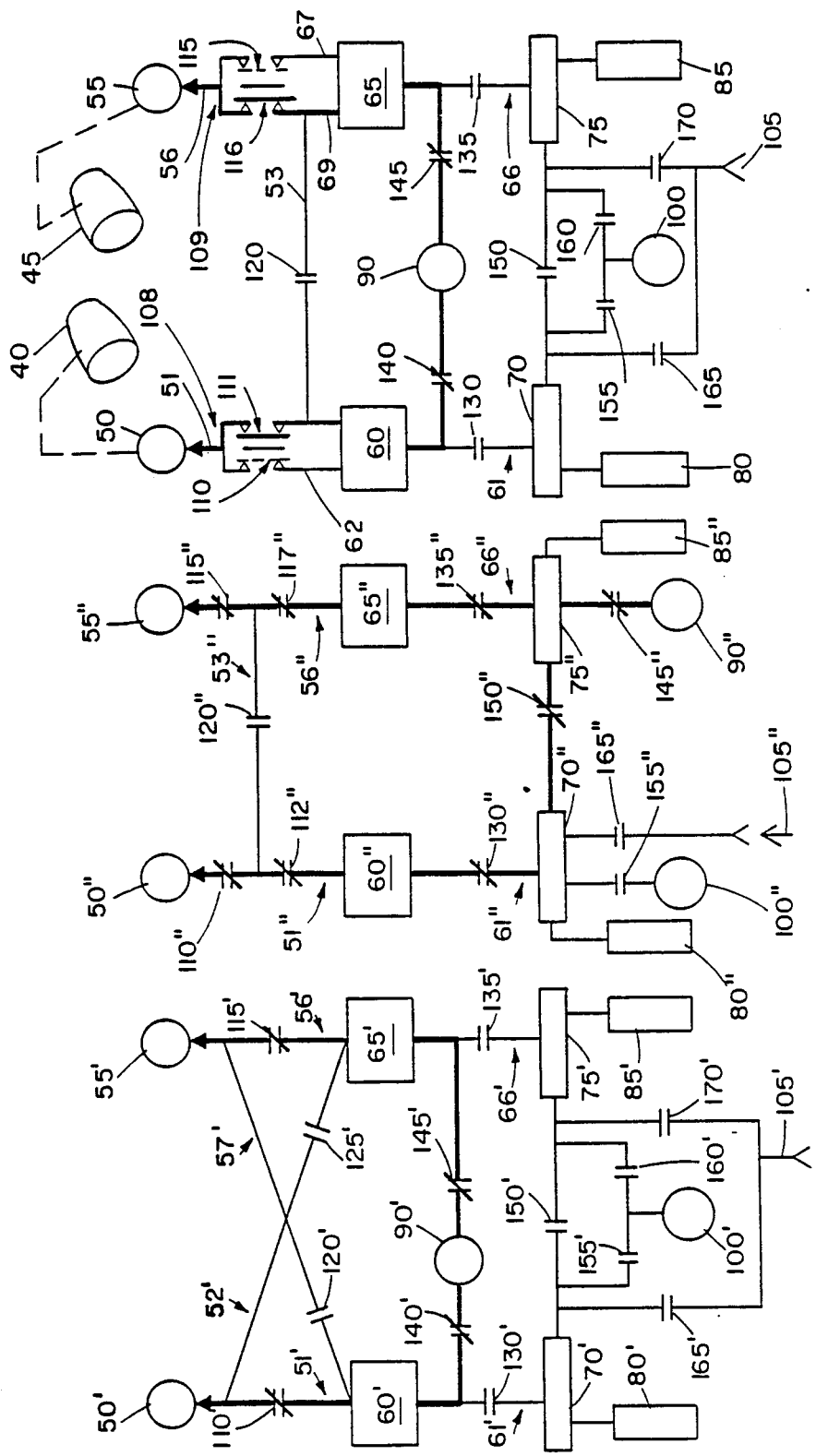
FIG. 8a illustrates prior art system I in emergency operation, with no faults, in diagrammatic form.
FIG. 8b illustrates prior art system II in emergency operation, with no faults, in diagrammatic form.
FIG. 8c illustrates the instant invention in emergency operation, with no faults, in diagrammatic form.

FIGS. 8a, 8b and 8c show System I, System II and the instant invention in emergency operation, with no faults.

In System I and the instant invention, the emergency generator 90, 90' is coupled to the first converter 60, 60' and the second converter 65, 65' by the first emergency generator relay 140, 140' and the second emergency generator relay 145, 145', respectively. In practice, the emergency generator 90, 90' is unable to provide power simultaneously to both the first channel and the second channel. Therefore, closure of the first emergency generator relay 140, 140' and the second emergency generator relay 145, 145' is alternative. After reaching the respective converters 60, 60',65, 65', power is transferred through the first motor/generator feeder 51, 51' and the second motor/generator feeder 56, 56' by closure of the first motor/generator relay 110, 110' and the second motor/generator 115, 115'. In this manner, constant frequency power produced by the emergency generator 90, 90' is converted to variable frequency power by the converters 60, 60', 65, 65' and thereafter delivered to the first and second motor/generators 50, 50', 55, 55' respectively. Transfer of power to the motor/generators 50, 50', 55, 55' causes operation as a motor thereby delivering motive power to the first and second prime movers 40 and 45. Accordingly, the prime movers 40 and 45 may be started.

In System II, the emergency generator 90" is connected to the second power bus 75" by closure of the emergency generator relay 145". Closure of the second power bus relay 135", the second converter 117" and the second motor/generator relay 115' couples the emergency generator 90" to the second motor/generator 55" to allow the emergency generator 90", providing constant frequency power, to supply the power to the second converter 65", which converts the power to variable frequency power to be supplied to the second motor/generator 55" to operate it as a motor to start the second prime mover 45. Alternatively, by closure of the bus tie relay 150", the first power bus relay 130", the first converter relay 112" and the first motor/generator relay 110", the emergency generator 9" can be connected to the first converter 60", allowing the emergency 90" to supply constant frequency power to the first converter 60", which in turn, supplies variable frequency power to the first motor/generator 50" to effect a starting of the first prime mover 40.

Note that all three systems can successfully start both prime movers alternatively from the emergency generator, with no faults present.

Direct Start Mode from Power Bus - No faults

Figures 9A, 9B, 9C:
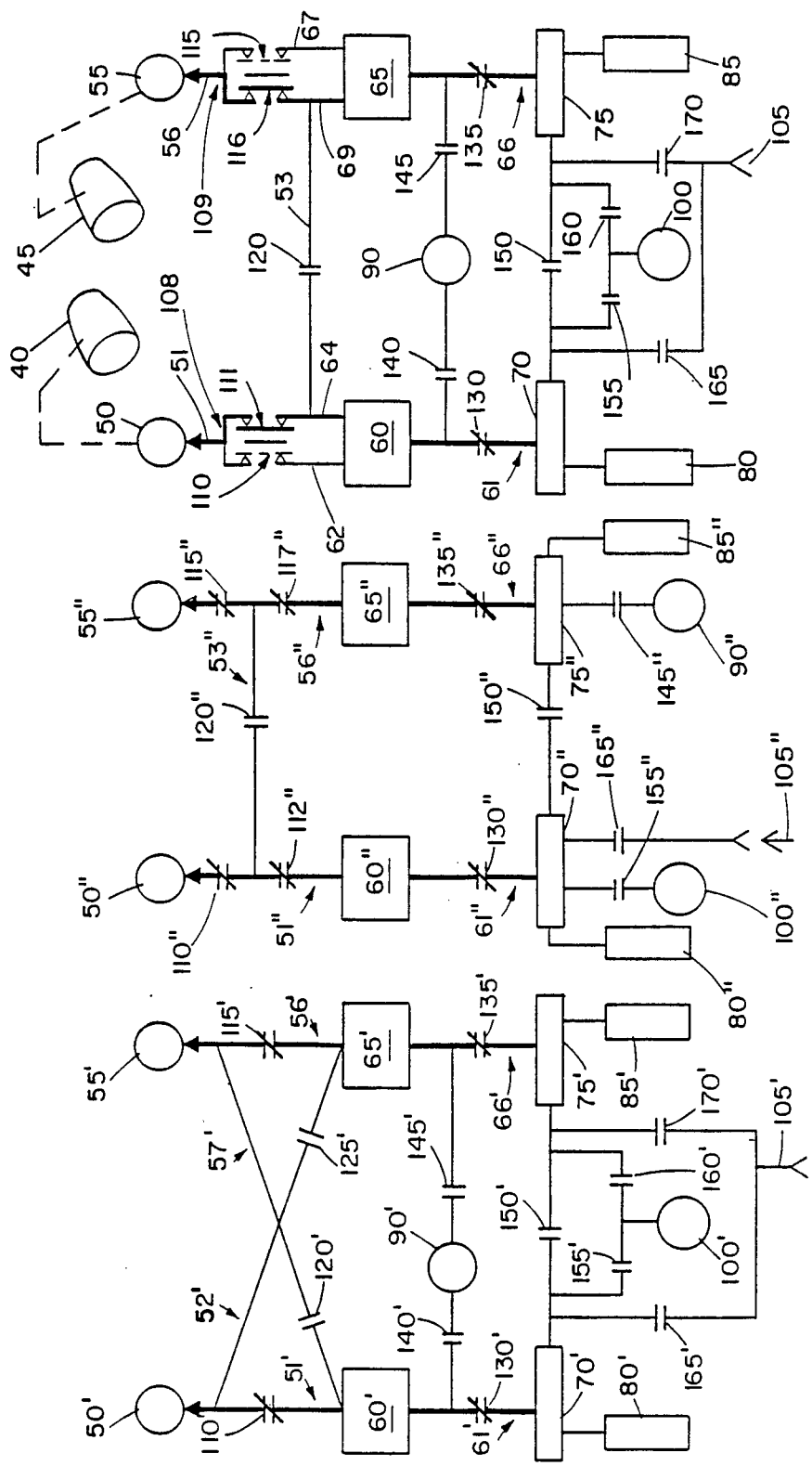
FIG. 9a illustrates prior art system I in direct start mode using the power buses for external power, with no faults, in diagrammatic form.
FIG. 9b illustrates prior art system II in direct start mode using the power buses for external power, with no faults, in diagrammatic form.
FIG. 9c illustrates the instant invention in direct start mode using the power buses for external power, with no faults, in diagrammatic form.

FIGS. 9a, 9b and 9c show System I, System II and the instant invention in direct start mode using power bus power for external power, with no faults. Note that once power is present on the first power bus 70, 70', 70" or the second power bus 75, 75', 75", regardless of source, power may be transferred through closure of the first power bus relay 130, 130', 130" and the first motor/generator relay 110, 110., 110" to effect operation of the first motor/generator 50, 50', 50" as a motor to start the first prime mover 40. Alternatively, by closure of the second power bus relay 135, 135', 135" and the second motor/generator relay 115, 115', 115", power may be transferred to the second motor/generator 55, 55', 55" to start the second prime mover 45. Note that the first and second power buses produce constant frequency power which is converted to variable frequency power by the converters. Normal operation is evidenced in all three systems in this mode assuming no faults.

Constant Frequency Cross-Start Mode - No Faults

Figures 10A, 10B, 10C:
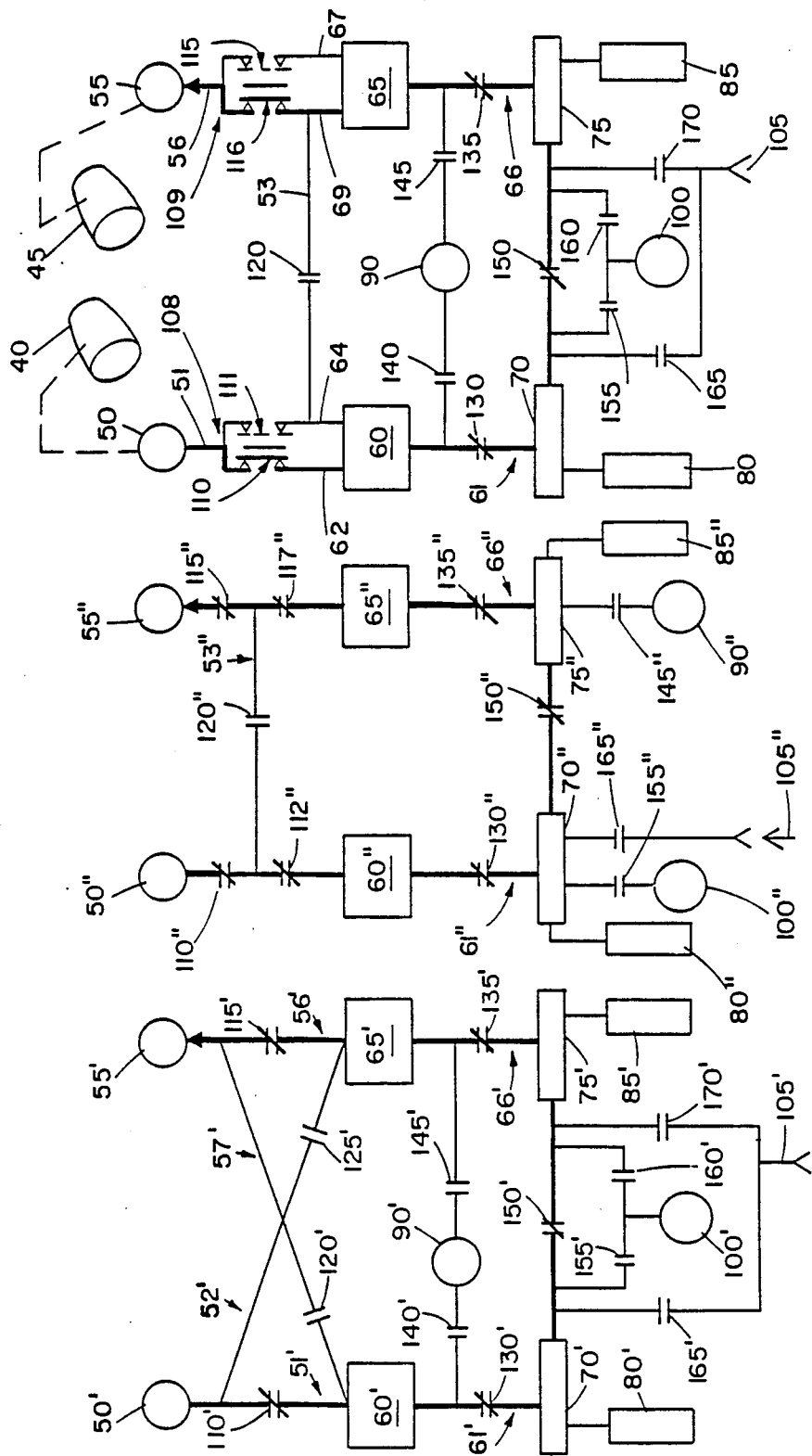
FIG. 10a illustrates prior art system I in constant frequency cross-start mode using converter AC power, with no faults, in diagrammatic form.
FIG. 10b illustrates prior art system II in constant frequency cross-start mode using converter AC power, with no faults, in diagrammatic form.
FIG. 10c illustrates the instant invention in constant frequency cross-start mode using converter AC power, with no faults, in diagrammatic form.

FIGS. 10a, 10b and 10c show System I System II and the instant invention in constant frequency cross-start mode with converter AC power, with no faults.

In System I, closure of the first motor/generator relay 110', the first power bus relay 130', the bus tie relay 150', the second power bus relay 135' and the second motor/generator relay 115' allows a constant frequency cross-start (first channel to second channel). The first motor/generator 50' produces variable frequency power which is a function of the first prime mover 40 which drives it. The variable frequency power is delivered to the first converter 60', converted to constant frequency power, and delivered to the first power bus 70'. Power is delivered across the bus tie relay 150' to the second power bus 75', then to the second converter 65', which converts the constant frequency power to variable frequency power to operate the second motor/generator 55' as a motor to start the second prime mover 45.

In System II, operation is similar to that in System I with the additional closure of the first converter relay 112" and the second converter relay 117".

In the instant invention, the first motor/generator relay 108 is set to its first position 110 and the second motor/generator relay 109 is set to its second position 116 to allow the first motor/generator 50 to provide variable frequency power to the first converter 60 via the first motor/generator feeder 51, the first motor/generator relay 108 and the first converter input feeder 62. The first converter 60 delivers constant frequency power to the second converter 65 via the first power bus feeder 61, the first power bus relay 130, the first power bus 70, the bus tie relay 150, the second power bus 75, the second power bus relay 135 and the second power bus feeder 66. The second converter 65 produces variable frequency power which is delivered to the second motor/generator 55 via the second converter output feeder 69, the second motor/generator relay 109 and the second motor/generator feeder 56. Delivery of variable frequency power to the second motor/generator 55 causes it to operate as a motor, delivering motive force to the second prime mover 45 to start same.

Note that all three systems are able to perform the constant frequency cross-start mode, with no faults present.

Variable Frequency Cross-Start Mode - No Faults

FIGS. 11a, 11b and 11c show System I, System II and the instant invention in variable frequency bus cross-start mode left bus to right bus with no faults. It is assumed in each figure that constant frequency power has been delivered to the first power bus 70, 70', 70". This constant frequency power may be delivered by the emergency generator, APU or a source external to the aircraft through the external power inlet 105, 105', 105".

In System I, variable frequency bus cross-start is accomplished by closure of the first power bus relay 130' and the second cross-start relay 120'. Constant frequency power present on the first power bus 70' is thereby delivered to the first converter 60', the variable frequency output of which is delivered along the second cross-start feeder 57' to the second motor/generator 55'.

In System II, closure of the first power bus relay 130", the first converter relay 112", the cross-start relay 120" and the second motor/generator relay 115" allows constant frequency power present on the first power bus 70" to be delivered to the first converter 60", the variable frequency output of which is delivered via the cross-start feeder 53" to the second motor/generator 55".

In the instant invention, closure of the first power bus relay 130, the cross-start relay 120 and the second motor/generator relay 109 in its second position 116 allows constant frequency power present on the first power bus 70 to be transferred to the first converter 60, the variable frequency output of which is delivered along the cross-start feeder 53 to the second motor/generator 55 to cause motive rotation of same.

Note that all three systems provide for variable frequency bus cross-start operation, with no faults.

Generate Mode - Closed Relay

Figures 12A, 12B, 12C:
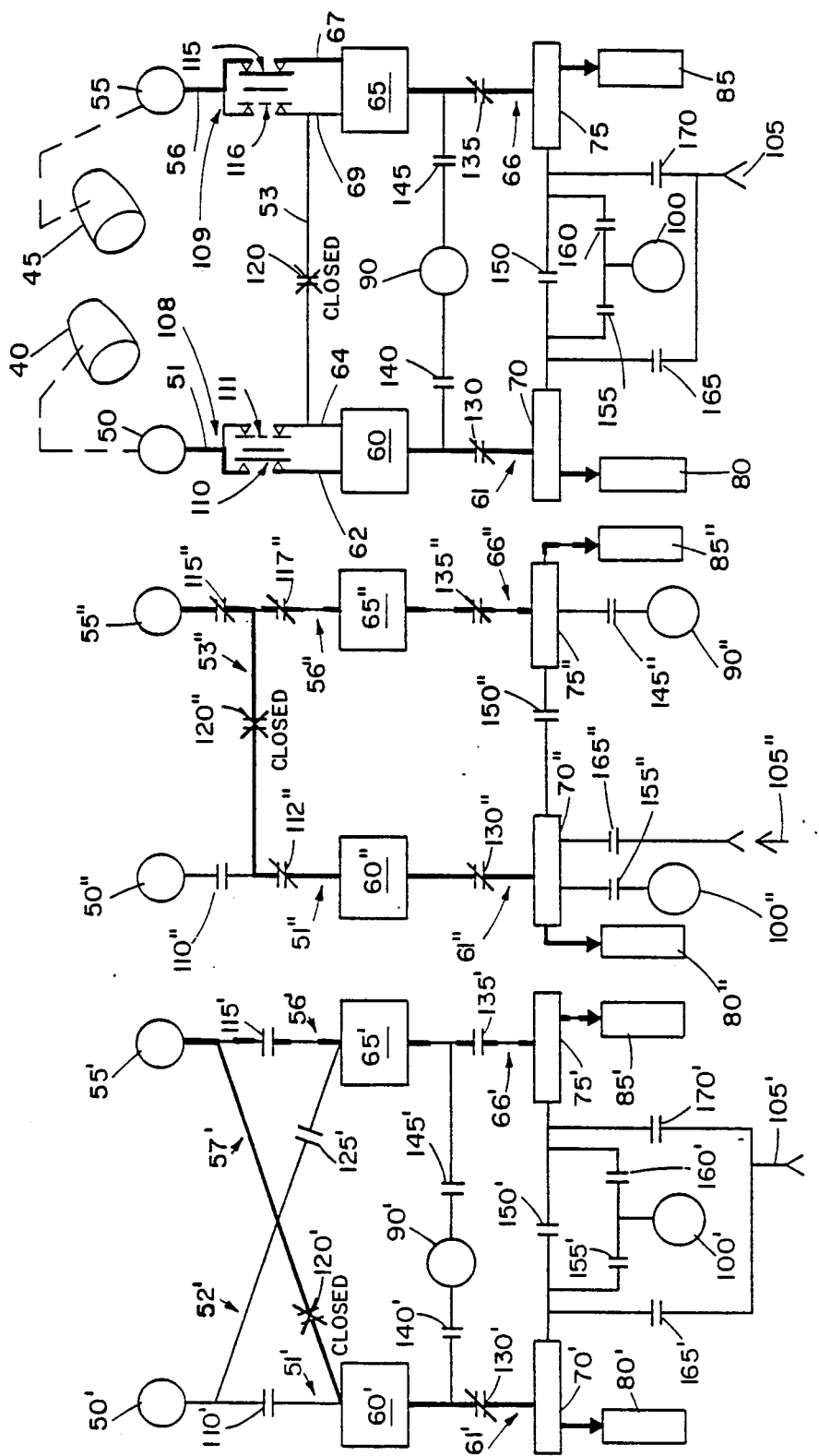
FIG. 12a illustrates prior art system I in generate mode, with a faulted closed cross-start relay, in diagrammatic form.
FIG. 12b illustrates prior art system II in generate mode, with a faulted closed cross-start relay, in diagrammatic form.
FIG. 12c illustrates the instant invention in generate mode, with a faulted closed cross-start relay, in diagrammatic form.

FIGS. 12a, 12b and 12c show System I, System II and the instant invention in generate mode, with a faulted closed cross-start relay. Faulting of a relay is represented by an "x" drawn through the relay to be faulted.

In System I, two options are available. The first option, shown by a heavy solid line, shows that, with the second cross-start relay 120' faulted closed, output from the second motor/generator 55' must be fed to the first converter 60' because of the faulted closed cross-start realy 120'. Then, by closure of the first power bus relay 130', constant frequency power may be delivered to the first power bus 70' and first external aircraft electrical load 80'. Alternatively, (shown by a heavy dotted line) the second motor/generator 55' can power the second converter 65' by closure of the second motor/generator relay 115'. Power can then be delivered to the second power bus 75' and the second external aircraft electrical load 85' by closure of the second power bus relay 135'. If the latter option is chosen, the first motor/generator 50' must be de-excited, because the first converter 60' cannot be driven by both motor/generators 50' and 55'. Accordingly, the first motor/generator relay 110' and the first cross-start relay 125' must remain open. If the former option is chosen, both the first and second motor/generator relays 110' and 115' may be left open and the first cross-start relay 125' closed to allow the first motor/generator 50' to power the second converter 65' and the second motor/generator 55' to power the first converter 60'.

In System II, there are also two options. First, if the cross-start relay 120" is faulted closed, the second motor/generator 55" can be made to power the first converter 60" by closure of the second motor/generator relay 115" and the first converter relay 112". Alternatively, the second motor/generator 55" can power the second converter 65" by closure of the second motor/generator relay 115" and the second converter relay 117". In either alternative, the first motor/generator relay 110" must remain open as the outputs of the first and second motor/generators 50" and 55" may not operate in parallel. Of course, the same options are available with respect to the first motor/generator 50", but the second motor/generator 55" must nonetheless be deactivated by opening the second motor/generator relay 115". One motor/generator cannot power both channels. Therefore, System II is deficient in this mode because there is no isolation in the motor/generator-to-converter feeder between start and generate mode.

In the instant invention, when the cross-start relay 120 is faulted closed, the first motor/generator relay 108 is placed in its first contact position 110 and the second motor/generator relay 109 is placed in its first contact position 115, isolating the cross-start feeder 53 and, thereby, the cross-start relay 120, allowing normal operation of both channels in the generate mode.

Generate Mode - Shorted Relay

Figures 13A, 13B, 13C:
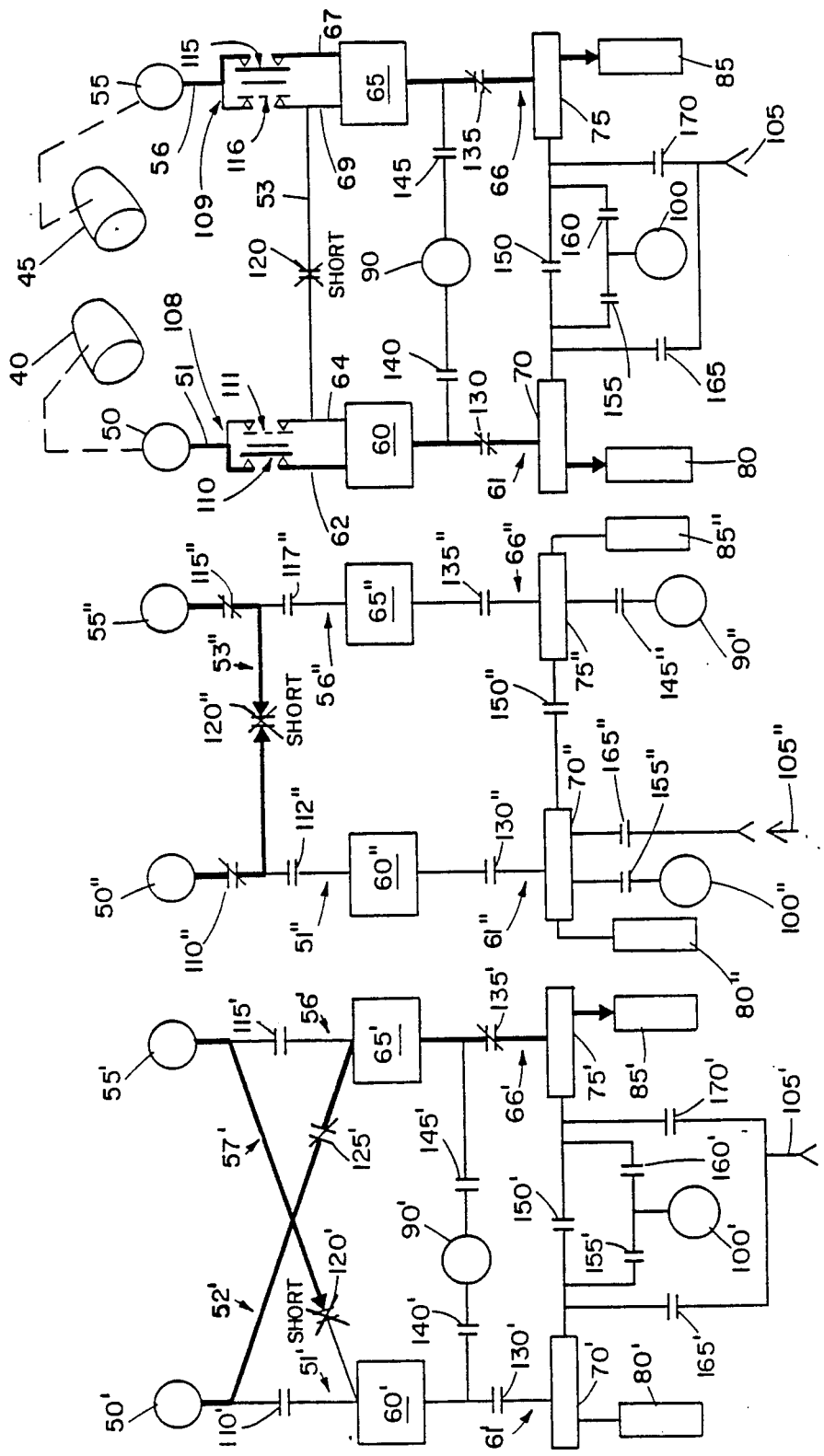
FIG. 13a illustrates prior art system I in generate mode, with a shorted cross-start relay, in diagrammatic form.
FIG. 13b illustrates prior art system II in generate mode, with a shorted cross-start relay, in diagrammatic form.
FIG. 13c illustrates the instant invention in generate mode, with a shorted cross-start relay, in diagrammatic form.

FIGS. 13a, 13b and 13c show System I, System II and the instant invention in generate mode, with a shorted cross-start relay.

In System I, the second cross-start relay 120' has been shorted. Accordingly, since it is permanently wired to the second motor/generator 55', the second motor/generator 55' is disabled. The only option available for System I is to employ the first motor/generator 50' as a power source with the second converter 65' by closure of the first cross-start relay 125' and use of the first cross-start feeder 52'. Powering of the first converter 60' is impossible, since it is also permanently connected to the second cross-start relay 120'.

In System II, a short in the cross-start relay 120' disables both the first motor/generator 50" and the second motor/generator 55", because the cross-start feeder 53" is permanently connected to the first motor/generator feeder 51" and the second motor/generator feeder 56". Accordingly, both channels must resort to auxiliary power unit or emergency power for operation in this mode.

In the instant invention, a short in the cross-start relay 120 produces the same results as in FIG. 12, wherein the cross-start relay 120 was merely faulted closed. Since the first motor/generator relay 108 is in its first contact position 110 and the second motor/generator relay 109 is in its first contact position 115, both channels operate normally. The fault in the cross-start relay 120 has been totally isolated.

Variable Frequency Bus Cross-Start Mode - Closed Relay

Figures 14A, 14B, 14C:
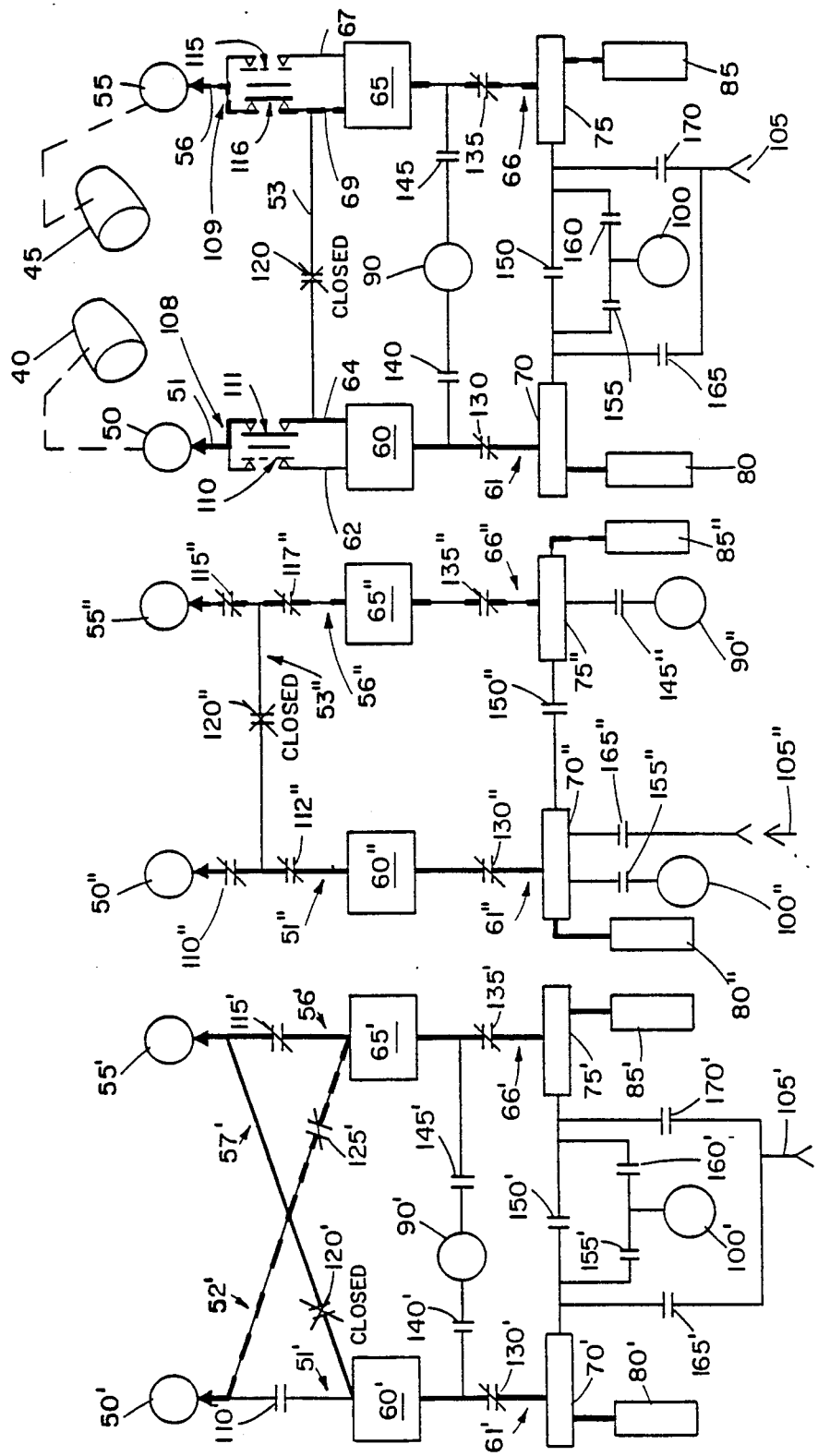
FIG. 14a illustrates prior art system I in variable frequency bus cross-start mode, with a faulted closed cross-start relay, in diagrammatic form.
FIG. 14b illustrates prior art system II in variable frequency bus cross-start mode, with a faulted closed cross-start relay, in diagrammatic form.
FIG. 14c illustrates the instant invention in variable frequency bus cross-start mode, with a faulted closed cross-start relay, in diagrammatic form.

FIGS. 14a, 14b and 14c show System I, System II and the instant invention in variable frequency bus cross-start mode, with a faulted closed cross-start relay.

In System I, in this fault mode, it is again assumed that the second cross-start relay 120 is faulted closed. During engine start, two options are available. The first option, represented by a solid line, is chosen by closing the first power bus relay 130'. Constant frequency power is thereby delivered from the first power bus 70' to the first converter 60', the variable frequency output of which is delivered to the second motor/generator 55' via the second cross-start feeder 57'. Alternatively, the second motor/generator 55' may be started by driving constant frequency power from the second power bus 75' and, by closure of the second power bus relay 135' and the second motor/generator relay 115', can be delivered to the second motor/generator 55'. If starting of the first motor/generator 50' is desired, the second motor/generator relay 115' can be opened, and the first cross-start relay 125' can be closed. This option is shown by a dotted line.

In System II, direct starting of both the first motor/generator 50" and the second motor/generator 55" can be accomplished by closure of the first power bus relay 130", the first converter relay 112" and the first motor/generator relay 110" and the second power bus relay 135", the second converter relay 117" and the second motor/generator relay 115", alternatively, as only one channel may be started at a time. Once the first motor/generator 50" and the second motor/generator 55" have been started, one of the channels must be de-energized because, as demonstrated according to FIG. 12, only one channel can operate with a faulted closed cross-start relay.

In the instant invention, direct start of the first motor/generator 50 and the second motor/generator 55 is still possible with a faulted closed cross-start relay 120. The first motor/generator relay 108 is placed in its second contact position 111 or the second motor/generator relay is placed in its second contact position 116. Thereby, the first motor/generator 50 and the second motor/generator 55 may be started alternatively. Thereafter, both channels can continue operation in the generate mode unaffected by the faulted closed cross-start relay 120, as per FIG. 12c.

Variable Frequency Bus Cross-Start Mode - Shorted Relay

FIGS. 15a, 15b and 15c show System I, System II and the instant invention in variable frequency bus cross-start mode, with a shorted cross-start relay.

In System I, if the second cross-start relay 120' is shorted, only the first motor/generator 50' may be started. Starting of the first motor/generator 50' is accomplished by closure of the first cross-start relay 125'. The second motor/generator 55' may not be started because it is permanently connected to the shorted second cross-start relay 120'.

In System II, a short in the cross-start relay 120" prevents starting of either the first motor/generator 50" or the second motor/generator 55".

In the instant invention, a short in the cross-start relay 120 likewise prevents either the first motor/generator 50 or the second motor/generator 55 from being started. Although it is possible to trace a circuit from the first converter 60 to the second motor/generator 55 via the second converter input feeder 67, insufficient torque would be delivered by the second motor/generator 55 to start the second prime mover 45 from a standstill. 400 Hertz constant frequency delivered to the second motor/generator 55 would operate it as an induction motor. The amount of power necessary to run it in this manner would overheat it. However, if the second prime mover 45 were windmilling, perhaps enough torque could be delivered to start the same given a sufficient initial speed.

Generate Mode - Bus Fault

Figures 16A, 16B, 16C:
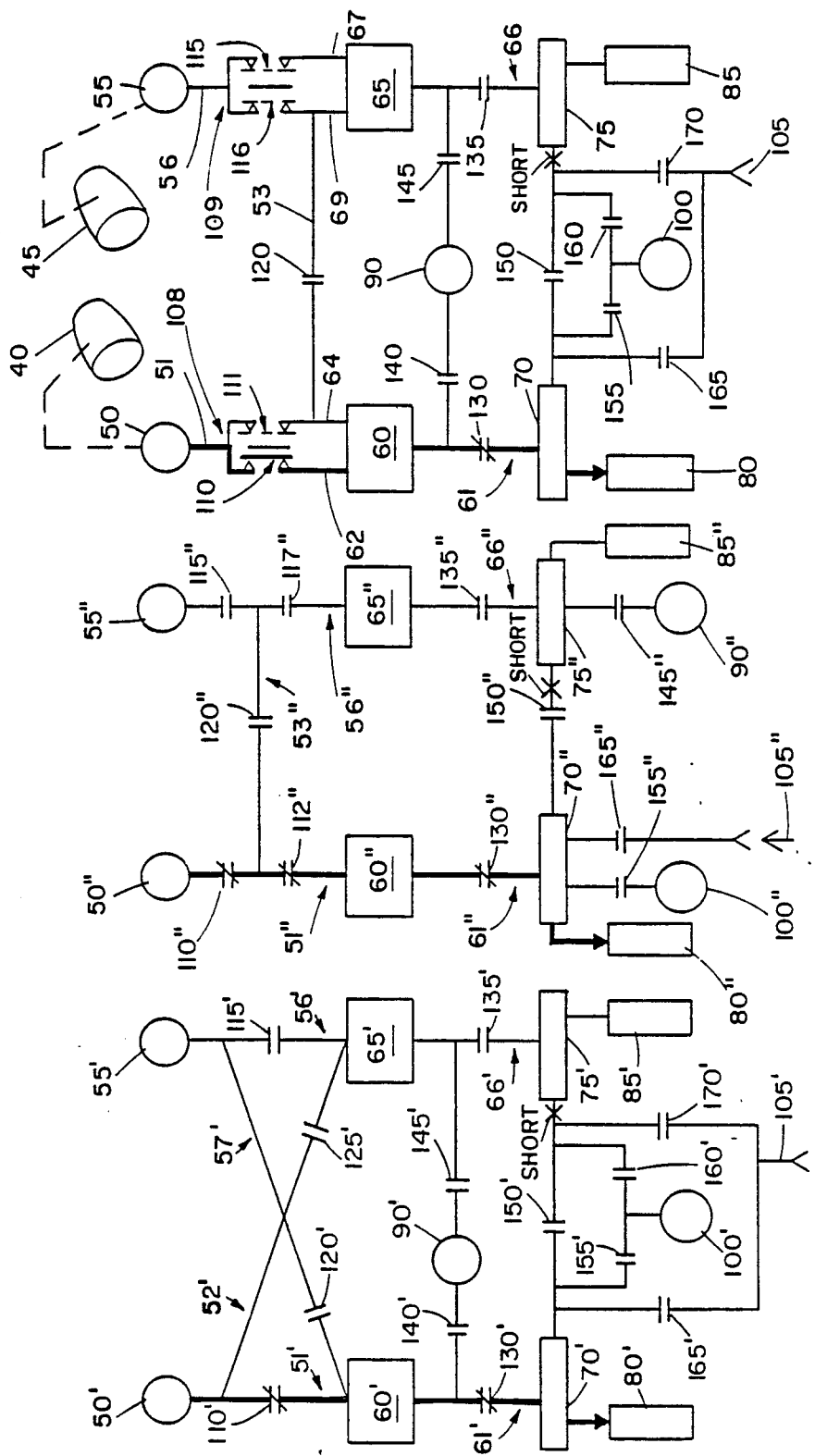
FIG. 16a illustrates prior art system I in generate mode, with a bus fault, in diagrammatic form.
FIG. 16b illustrates prior art system I in generate mode, with a bus fault, in diagrammatic form.
FIG. 16c illustrates the instant invention in generate mode, with a bus fault, in diagrammatic form.

FIGS. 16a, 16b and 16c show System I, System II and the instant invention in generate mode, with a bus fault.

In System I, the second power bus 75' is faulted by a short. Accordingly, it is impossible to power the second external aircraft load 85'. However, the first channel is still available as long the bus tie relay 150' remains open. Accordingly, the first motor/generator 50' can power the first converter 60' by closure of the first motor/generator relay 110' or the second motor/generator 55 can power the first converter 60' by closure of the second cross-start relay 120'.

In System II, shorting of the second power bus 75" also disables the second channel. As in System I, the first converter 60" may be powered by the first motor/generator 50" by closure of the first motor/generator relay 110" and the first converter relay 112". Alternatively, the second motor/generator 55' can power the first converter 60" by closure of the second motor/generator relay 115", the cross-start relay 120" and the first converter relay 112".

In the instant invention, as in the previous systems, shorting of the second power bus 75 causes failure of the second channel. However, by closure of the first motor/generator relay 108 in its first contact position 110, the first motor/generator 50 can power the first converter 60.

Direct Start Mode - Bus Fault

Figures 17A, 17B, 17C:
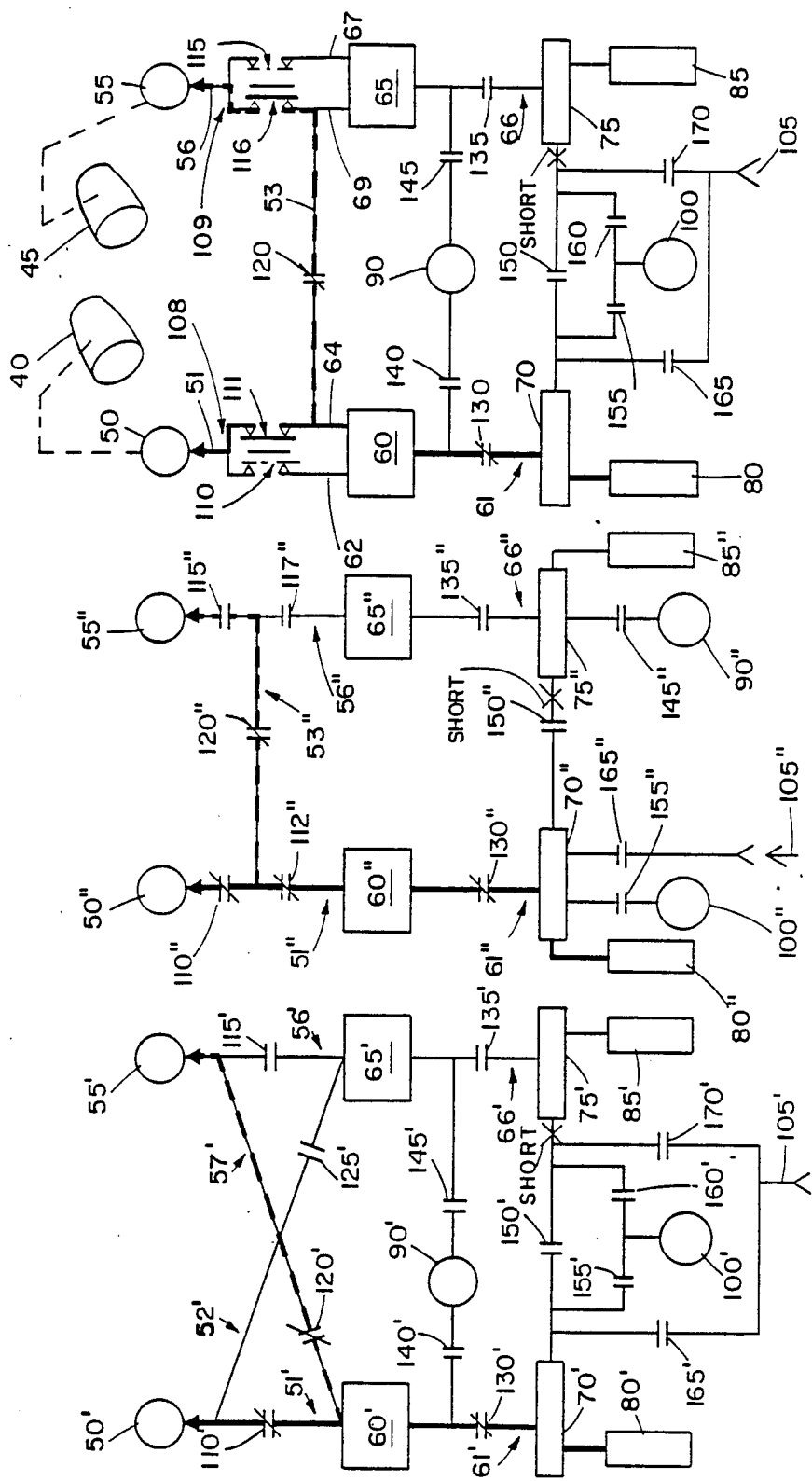
FIG. 17a illustrates prior art system I in direct start-mode, with a bus fault, in diagrammatic form.
FIG. 17b illustrates prior system II in direct start-mode, with a bus fault, in diagrammatic form.
FIG. 17c illustrates the instant invention in direct start-mode, with a bus fault, in diagrammatic form.

FIGS. 17a, 17b and 17c show System I, System II and the instant invention in direct start mode, with a bus fault.

System I permits starting of both the motor/generator 50' and the second motor/generator 55' by closure of the first motor/generator 110' or the second cross-start relay 120', respectively.

In System II, both the first motor/generator 50" and the second motor/generator 55" may be started by closure of the first converter relay 112" and the first motor/generator relay 110" or the first converter relay 112", the cross-start relay 120" and the second motor/generator relay 115". Note that shorting of the second power bus 75" disables any use of the emergency generator 90". Alternatively, where the first power bus 70" to be shorted, the auxiliary power unit 100" and the external power inlet 105" would be disabled.

In the instant invention, shorting of the second power bus 75 also allows the starting of the first motor/generator 50 or the second motor/generator 55. Starting of the first motor/generator 50 is accomplished by closure of the first motor/generator relay 108 in its second contact position 111. Starting of the second motor/generator 55 is accomplished by closure of the cross-start relay 120 and the second motor/generator relay 109 in its second position 116.

In Flight with Bus Fault and Engine Restart

Figures 18A, 18B, 18C:
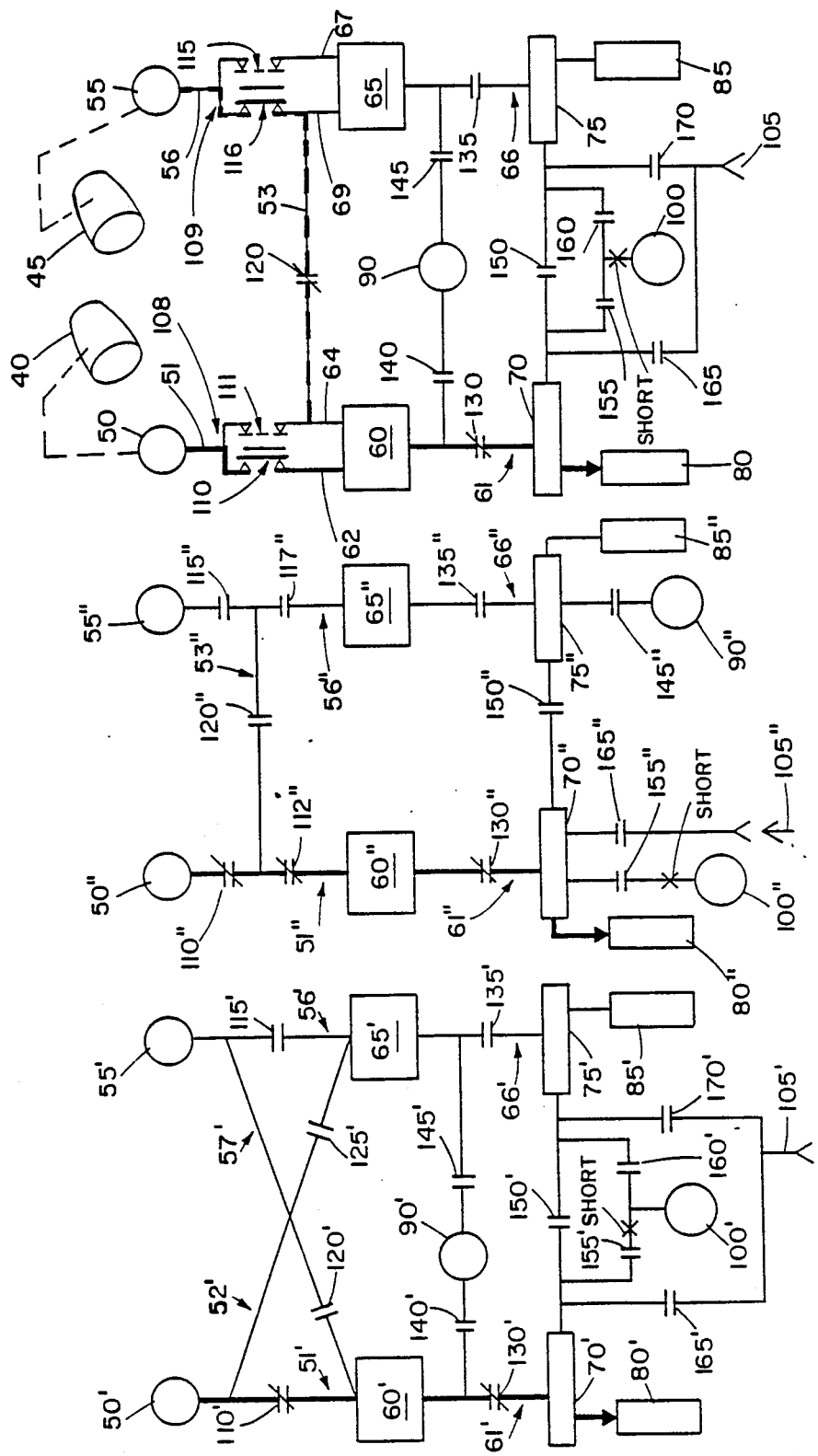
FIG. 18a illustrates prior art system I in flight, with a bus fault and engine shut-down, requiring a restart in diagrammatic form.
FIG. 18b illustrates prior art system II in flight, with a bus fault and engine shut-down, requiring a restart in diagrammatic form.
FIG. 18c illustrates the instant invention in flight, with a bus fault and engine shut-down, requiring a restart in diagrammatic form.

FIGS. 18a, 18b and 18c show System I, System II and the instant invention in flight, with a bus fault and engine shut-down, requiring a restart. In all three systems, it is assumed that the second prime mover 45 has been shut down in mid-flight and that it is desirable to restart the second prime mover 45. It is also assumed that there is a short in the APU 100, 100' 100".

In System I, the only option available to start the second motor/generator 55' by use of the first motor/generator 50' is to close the bus tie relay 150', thereby connecting the first power bus 70' and the second power bus 75'. Accordingly, the first motor/generator 50' can supply variable frequency power to the first converter via closed motor/generator relay 110'. The first converter 60' can supply constant frequency power to the second converter 65' via the closed first power bus relay 130', the first power bus 70', the closed bus tie relay 150', the second power bus 75' and the closed second power bus relay 135'. The second converter 65' can then supply variable frequency power to the second motor/generator via the closed second motor/generator relay 115'. Note that System I requires use of the first and second power buses 70' and 75' to operate in this mode.

In System II, as in System I, the only option available to start the second motor/generator 55", by use of the first motor/generator 50", is to close the bus tie relay 150", thereby connecting the first power bus 70" and the second power bus 75". Accordingly, the first motor/generator 50" can supply variable frequency power to the first converter via closed first motor/generator relay 110" and first converter relay 112". The first converter 60" can supply constant frequency power to the second converter 65" via the closed first power bus relay 130", the first power bus 70", the closed bus tie relay 150", the second power bus 75" and the closed second power bus relay 135". The second converter 65" can then supply variable frequency power to the second motor/generator 55" via the closed second converter relay 117" and second motor/generator relay 115". Note that System II also requires use of the first and second power buses 70" and 75" to operate in this mode. (It is impossible to effect starting of the second motor/generator 55" by closure of the first motor/generator relay 110", cross-start relay 120" and second motor/generator relay 115". Again, operation of the second motor/generator 55" in anything other than in synchronous fashion would be insufficient or would overheat the motor/generator.)

In the instant invention, two options are available. First, the second motor/generator may be started by closure of the first motor/generator relay 108 in its first contact position 110, closure of the first power bus relay 130, the bus tie relay 150, the second power bus relay 135 and the second motor/generator relay 109 in its second contact position 116. This is as in System I. Alternatively, cross-start of the second motor/generator 55 may be accomplished by closure of the first motor/generator relay 108 in its first contact position 110, the cross-start relay 120 and the second motor/generator relay 109 in its second contact position 116. In this way, the first motor/generator 50 can produce variable frequency power and deliver it to the first converter 60. Output from the first converter 60 can be transferred to the second motor/generator 55 via the cross-start feeder 53 and the second motor/generator relay 109 in its second position 116. Neither System I nor System II provides for this mode of operation, which totally bypasses the first power bus 70 and the second power bus 75, giving the instant invention an advantage over Systems I and II if either the first or second power bus 70 and 75 fails. Furthermore, the instant invention's new mode of operation allows line loss and multiple converter inefficiency to be avoided. By not having to use the very long power buses and both converters to transmit power, significant savings are realized in motor/generator and converter size.

From the foregoing description, it is apparent that the invention described provides a novel cross-start bus configuration for a variable speed frequency electric power system employing a novel combination of relays and feeders which, in combination, allow for efficient and reliable modes of operation not found in the prior art and for continued operation in a power generate mode by fault isolation.

Although this invention has been illustrated and described in connection with the particular embodiments illustrated, it will be apparent to those skilled in the art that various changes may be made therein without departing from the spirit of the invention as set forth in the appended claims.

I claim:

1. In a variable speed constant frequency motor/generator power system having first and second channels, said first channel having a first converter coupled to a first power bus and said second channel having a second converter coupled to a second power bus, a cross-start subsystem, comprising:
   a circuit having a variable frequency cross-start mode coupling a first motor/generator associated with said first channel to a second motor/generator associated with said second channel via said first converter to thereby allow said first motor/generator, operating as a generator, to supply variable frequency power to said first converter, said first converter supplying variable frequency power to said second motor/generator to operate said second motor/generator as a motor.

2. The variable speed constant frequency motor/generator power system as recited in claim 1 wherein said circuit has a generate circuit mode coupling said first motor/generator to an external electrical load via said first converter and said first power bus to thereby allow said first motor/generator, operating as a generator, to supply variable frequency power to said first converter, said first converter supplying constant frequency power to said external electrical load.

3. The variable speed constant frequency motor/generator power system as recited in claim 2 wherein said circuit has a direct start circuit mode coupling an external constant frequency electrical source to said first motor/generator via said first power bus and said first converter to thereby allow said external constant frequency electrical source to supply power to said first converter, said first converter supplying variable frequency power to said first motor/generator to operate said first motor/generator as a motor.

4. The variable speed constant frequency motor/generator power system as recited in claim 3 wherein said circuit has a constant frequency cross-start circuit mode coupling said first motor/generator to said second motor/generator via said first converter, said first power bus, said second power bus and said second converter to thereby allow said first motor/generator, operating as a generator, to supply variable frequency power to said first converter, said first converter supplying constant frequency power to said second converter via said first and second power buses and said second converter supplying variable frequency power to said motor/generator to operate said second motor/generator as a motor.

5. The variable speed constant frequency motor/generator power system as recited in claim 4 wherein said circuit has a variable frequency bus cross-start circuit mode coupling said external constant frequency electrical source to said second motor/generator via said first power bus and said first converter,
   said external constant frequency electrical source supplying power to said first converter, said first converter supplying variable frequency power to said second motor/generator to operate said second motor/generator as a motor.

6. The variable speed constant frequency motor/generator power system as recited in claim 5 wherein said first motor/generator is coupled to a first prime mover to drive or be drive by said first prime mover and said second motor/generator is coupled to a second prime mover to drive or be driven by said second prime mover.

7. The variable speed constant frequency motor/generator power system as recited in claim 6 wherein said first and second power buses supply constant frequency AC power to an aircraft.

8. The variable speed constant frequency motor/generator power system as recited in claim 7 wherein said first and second channels are adapted to provide three phase AC power to said aircraft.

9. The variable speed constant frequency motor/generator power system as recited in claim 8 wherein said first and second converter each comprise a filter, rectifier, exciter inverter and main inverter to thereby produce constant frequency power from variable frequency power, variable frequency power from constant frequency power or variable frequency power from variable frequency power.

10. The variable speed constant frequency motor/generator power system as recited in claim 9 wherein said first and second prime movers are each a jet engine.

11. In a variable speed constant frequency motor/generator power system having first and second channels, a cross-start subsystem, comprising:
   cross-start means for selectively coupling said first channel to said second channel to allow power to be transferred between said first channel and said second channel, said cross-start means completely decoupling from said first and second channels when said cross-start means is electrically faulted, resulting in electrical isolation of said first and second channels from said fault thereby allowing continued operation of said first and second channels.

12. The variable speed constant frequency motor/generator power system as recited in claim 11 wherein said first motor/generator is coupled to a first prime mover to drive or be driven by said first prime mover and said second motor/generator is coupled to a second prime mover to drive or be driven by said second prime mover.

13. The variable speed constant frequency motor/generator power system as recited in claim 12 wherein said first and second power buses supply constant frequency AC power to an aircraft.

14. The variable speed constant frequency motor/generator power system as recited in claim 13 wherein said first and second channels are adapted to provide three phase AC power to said aircraft.

15. The variable speed constant frequency motor/generator power system as recited in claim 14 wherein said first and second converter channels each include a converter, said converter comprising a filter, rectifier, exciter inverter and main inverter to thereby produce constant frequency power from variable frequency power, variable frequency power from constant frequency power or variable frequency power from variable frequency power.

16. The variable speed constant frequency motor/generator power system as recited in claim 15 wherein said first and second prime movers are each a jet engine.

17. In a variable speed constant frequency motor/generator power system having first and second channels, said first channel having a first converter coupled to a first power bus and said second channel having a second converter coupled to a second power bus, a cross-start subsystem, comprising a circuit having generate, direct start, constant frequency cross-start, variable frequency cross-start and variable frequency bus cross-start modes:

(a) said generate circuit mode coupling a first motor/generator to an external electrical load via said first converter and said first power bus to thereby allow said first motor/generator operating as a generator, to supply variable frequency power to said first converter, said first converter supplying constant frequency power to said external electrical load;

(b) said direct start circuit mode coupling an external constant frequency electrical source to said first motor/generator via said first power bus and said first converter to allow said external electrical source to supply power to said first converter, said first converter supplying variable frequency power to said first motor/generator to operate said first motor/generator as a motor;

(c) said constant frequency cross-start circuit mode coupling said first motor/generator to a second motor/generator via said first converter, said first power bus, said second power bus and said second converter to thereby allow said first motor/generator, operating as a generator, to supply variable frequency power to said first converter, said first converter supplying constant frequency power to said second converter and said second converter supplying variable frequency power to said second motor/generator, to operate said second motor/generator as a motor;

(d) said variable frequency cross-start circuit mode coupling said first motor/generator to said second motor/generator via said first converter to thereby allow said first motor/generator, operating as a generator, to supply variable frequency power to said first converter, said first converter supplying variable frequency power to said second motor/generator to operate said second motor/generator as a motor; and (e) said variable frequency bus cross-start circuit mode coupling said external Constant frequency electrical source to said second motor/generator via said first power bus and said first converter to thereby allow said external constant frequency electrical source to supply power to said first converter, said first converter supplying variable frequency power to said second motor/generator to operate said second motor/generator as a motor.

* * * * *